US012646485B2

(12) United States Patent
Lee et al.

(10) Patent No.: US 12,646,485 B2
(45) Date of Patent: Jun. 2, 2026

(54) METHOD FOR DRIVING DISPLAY SCALER IN VIDEO MODE AND ELECTRONIC DEVICE USING SAME METHOD

(71) Applicant: Samsung Electronics Co., Ltd., Suwon-si (KR)

(72) Inventors: Jaesung Lee, Suwon-si (KR); Jongkon Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/921,657

(22) Filed: Oct. 21, 2024

(65) Prior Publication Data

US 2025/0046269 A1 Feb. 6, 2025

Related U.S. Application Data

(63) Continuation of application No. PCT/KR2023/004394, filed on Mar. 31, 2023.

(30) Foreign Application Priority Data

Apr. 28, 2022 (KR) ........................ 10-2022-0052629
Sep. 1, 2022 (KR) ........................ 10-2022-0110902

(51) Int. Cl.
*G09G 5/00* (2006.01)
*G09G 5/22* (2006.01)

(52) U.S. Cl.
CPC ............. *G09G 5/005* (2013.01); *G09G 5/227* (2013.01); *G09G 2310/08* (2013.01);
(Continued)

(58) Field of Classification Search
CPC ........ G09G 5/005; G09G 5/227; G09G 5/006; G09G 5/18; G09G 2310/08;
(Continued)

(56) References Cited

U.S. PATENT DOCUMENTS 7,161,576 B2 1/2007 Kawabe et al.
7,800,700 B2 9/2010 Lee et al.
(Continued)

FOREIGN PATENT DOCUMENTS

JP 2003-066918 A 3/2003
KR 10-2004-0078531 A 9/2004
(Continued)

OTHER PUBLICATIONS

Extended European Search Report dated Jun. 23, 2025, issued in European Patent Application No. 23796640.3.
(Continued)

*Primary Examiner* — Brent D Castiaux
(74) *Attorney, Agent, or Firm* — Jefferson IP Law, LLP

(57) ABSTRACT

An electronic device is provided. The electronic device includes a display, a display driver IC (DDI) configured to drive the display on the basis of a video mode, memory storing one or more computer programs, and one or more processors communicatively coupled to the display, the DDI, and the memory, wherein the one or more computer programs include computer-executable instructions that, when executed by the one or more processors individually or collectively, cause the electronic device to generate first image data corresponding to a first resolution, generate second image data by adding a blank section to at least some sections of the first image data, and transmit the second image data to the DDI, and wherein the DDI comprises an upscaler configured to convert the second image data input from the one or more processors into third image data corresponding to a second resolution larger than the first resolution by a designated ratio, and is configured to drive the display so that the display displays the third image data.

22 Claims, 14 Drawing Sheets

(52) U.S. Cl.
CPC ................. *G09G 2330/021* (2013.01); *G09G 2340/0421* (2013.01); *G09G 2360/18* (2013.01)

(58) Field of Classification Search
CPC ....... G09G 2310/061; G09G 2330/021; G09G 2340/0421; G09G 2340/0407; G09G 2360/18; G09G 2360/02; G09G 2370/14
See application file for complete search history.

(56) References Cited

U.S. PATENT DOCUMENTS

| | | | |
|---|---|---|---|
| 8,848,792 B2 | 9/2014 | Macinnis et al. | |
| 9,761,202 B2 | 9/2017 | Tann et al. | |
| 10,672,097 B2 | 6/2020 | Bae et al. | |
| 10,674,113 B2 | 6/2020 | Park et al. | |
| 10,694,139 B2 | 6/2020 | Bae et al. | |
| 11,538,438 B2 | 12/2022 | Bae et al. | |
| 2011/0037785 A1* | 2/2011 | Shiomi | G09G 3/3426 345/102 |
| 2014/0063069 A1 | 3/2014 | Prabakaran et al. | |
| 2019/0379858 A1 | 12/2019 | Bae et al. | |
| 2022/0036853 A1* | 2/2022 | Bae | G09G 5/12 |

FOREIGN PATENT DOCUMENTS

| | | | |
|---|---|---|---|
| KR | 10-0719364 | B1 | 5/2007 |
| KR | 10-2017-0008698 | A | 1/2017 |
| KR | 10-2019-0043662 | A | 4/2019 |
| KR | 10-2020-0034320 | A | 3/2020 |
| KR | 20200034320 | A * | 3/2020 |
| KR | 10-2021-0037931 | A | 4/2021 |
| KR | 10-2256085 | B1 | 5/2021 |
| KR | 10-2021-0101437 | A | 8/2021 |

OTHER PUBLICATIONS

International Search Report dated Jul. 3, 2023, issued in International Application No. PCT/KR2023/004394.

* cited by examiner

METHOD FOR DRIVING DISPLAY SCALER IN VIDEO MODE AND ELECTRONIC DEVICE USING SAME METHOD

CROSS-REFERENCE TO RELATED APPLICATION(S)

This application is a continuation application, claiming priority under § 365 (c), of an International application No. PCT/KR2023/004394, filed on Mar. 31, 2023, which is based on and claims the benefit of a Korean patent application number 10-2022-0052629, filed on Apr. 28, 2022, in the Korean Intellectual Property Office, and of a Korean patent application number 10-2022-0110902, filed on Sep. 1, 2022, in the Korean Intellectual Property Office, the disclosure of each of which is incorporated by reference herein in its entirety.

BACKGROUND

1. Field

The disclosure relates to a method of driving a display scaler in a video mode and an electronic device using the method.

2. Description of Related Art

Electronic devices may display various screens such as images and texts through display panels.

A mobile industry processor interface display serial interface (MIPI DSI) is a display standard for portable electronic devices such as smartphones, tablet personal computers (PCs), or smart watches.

The MIPI DSI is a display standard and may include a video mode and a command mode.

In the video mode, a host (e.g., processor) may transmit image frames in real time to a display driver integrated circuit (IC). For example, in the video mode, even in the case that an image to be displayed on a display panel is a still image, the host may repeatedly transmit the same image frame corresponding to the still image to the display driver IC.

In the command mode, the transmission start of the image frame may be controlled by a tearing effect (TE) signal output from the display driver IC. The host (e.g., processor) may control transmission timing (e.g., refresh rate) of the image frame transmitted to the display driver IC based on the TE signal output from the display driver IC.

The above information is provided as background information only to assist with an understanding of the disclosure. No determination has been made, and no assertion is made, as to whether any of the above might be applicable as the prior art with regard to the disclosure.

SUMMARY

Upscaling is image processing technology in which a processor, which is a host transmits an image with a resolution smaller than an output resolution of a display panel to a display driver IC and in which the display driver IC converts the received image into the output resolution of the display panel. Upscaling enables efficient image processing and reduced power consumption by reducing memory size, a data transmission amount, and a data computation amount of an application processor (AP), an image processor, a display interface, or a display driver IC.

An upscaling operation includes an operation (e.g., data flow control) of adjusting the transfer timing of an image transmitted from the processor to the display driver IC. The adjustment operation is easy to implement in a command mode in which the display driver IC includes memory (or frame buffer) for temporarily storing the received image.

However, an electronic device according to a video mode in which the display driver IC does not include memory needs to dispose a separate memory inside the display driver IC in order to use upscaling technology, which may result in increased cost and increased power consumption.

Aspects of the disclosure are to address at least the above-mentioned problems and/or disadvantages and to provide at least the advantages described below. Accordingly, an aspect of the disclosure is to provide an electronic device and method thereof that operate based on a video mode and in which a display driver IC may perform an upscaling operation without including a separate memory.

Additional aspects will be set forth in part in the description which follows and, in part, will be apparent from the description, or may be learned by practice of the presented embodiments.

In accordance with an aspect of the disclosure, an electronic device is provided. The electronic device includes a display, a display driver IC (DDI) configured to drive the display based on a video mode, memory storing one or more computer programs, and one or more processor, wherein the p one or more computer programs include computer-executable instructions that, when executed by the one or more processors individually or collectively, cause the electronic device to generate first image data corresponding to a first resolution, to generate second image data by adding a blank section to at least some sections of the first image data, and to transmit the second image data to the DDI, wherein the DDI includes an upscaler configured to convert the second image data input from the one or more processors into third image data corresponding to a second resolution larger than the first resolution by a designated ratio, and be configured to drive the display so that the display displays the third image data.

In accordance with another aspect of the disclosure, a method performed by an electronic device including a display driver IC (DDI) configured to drive a display based on a video mode is provided. The method includes generating, by one or more processors, first image data corresponding to a first resolution, generating, by the one or more processors, second image data by adding a blank section to at least some sections of the first image data, transmitting, by the one or more processors, the second image data to the DDI, converting, by an upscaler of the DDI, the second image data input from the one or more processors into third image data corresponding to a second resolution larger than the first resolution by a designated ratio, and driving, by the DDI, the display so that the display displays the third image data.

A recording medium for storing instructions readable by one or more processors of an electronic device, wherein the instructions cause the one or more processors to generate first image data corresponding to the first resolution. The instructions cause the one or more processors to generate second image data by adding a blank section to at least some sections of the first image data. The instructions cause the one or more processors to transmit the second image data to a display driver IC (DDI) of the electronic device. The instructions cause an upscaler of the DDI to convert the second image data input from the one or more processors into third image data corresponding to a second resolution larger than the first resolution by a designated ratio. The instructions cause the DDI to drive the display so that the display displays the third image data.

An electronic device and method thereof according to an embodiment of the disclosure operate based on a video mode, but the display driver IC can perform an upscaling operation without including a separate memory.

In an electronic device and method thereof according to an embodiment of the disclosure, as one or more processors perform in advance output timing adjustment of image data for upscaling and transmits the image data to the DDI, the DDI configured to operate based on a video mode can perform upscaling without including memory, and reduce power consumption.

An electronic device and method thereof according to an embodiment of the disclosure do not need to consider a delay involved in adjusting data timing in a DDI, thereby enabling seamless resolution switching by not generating a separate frame-delay when switching a resolution (e.g., upscaling on/off or magnification switching).

One or more non-transitory computer-readable storage media storing one or more computer programs including computer-executable instructions that, when executed by one or more processors of an electronic device individually or collectively, cause the electronic device to perform operations is provided. The operations include generating first image data corresponding to a first resolution, generating second image data by adding a blank section to at least some sections of the first image data, transmitting the second image data to the DDI, converting, by an upscaler of the DDI, the second image data input into third image data corresponding to a second resolution larger than the first resolution by a designated ratio, and driving, by the DDI, a display so that the display displays the third image data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description, with reference to the accompanying drawings is provided to assist in a comprehensive understanding of various embodiments of the disclosure as defined by the claims and equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to bibliographical meanings, but, are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and equivalents.

It is to be understood that the singular forms “a”, “an”, and “the” include plural referents unless the context clearly dictates otherwise. Thus, for example, reference to “a component surface” includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
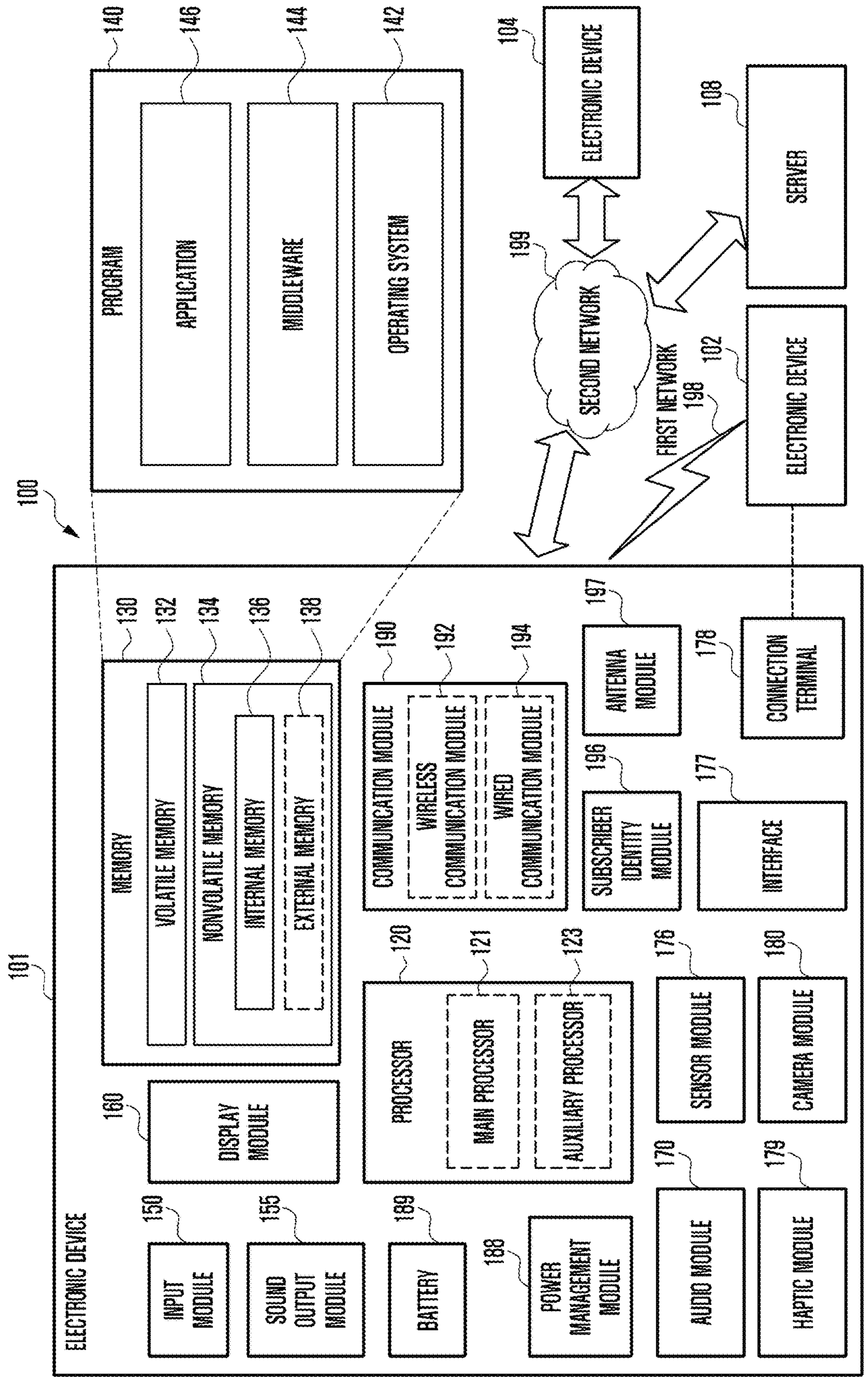
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). In an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123. In another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. In an embodiment, the input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. In an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to another embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may, for example, identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may, for example, support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to various embodiments, the antenna module 197 may form a millimeter wave (mmWave) antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be, for example, transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. In an example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may, for example, include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may, for example, be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to other embodiments, operations performed by the module, the program, or another component may be carried out sequentially, in parallel, repeatedly, or heuristically, or one or more of the operations may be executed in a different order or omitted, or one or more other operations may be added.

Figure 2:
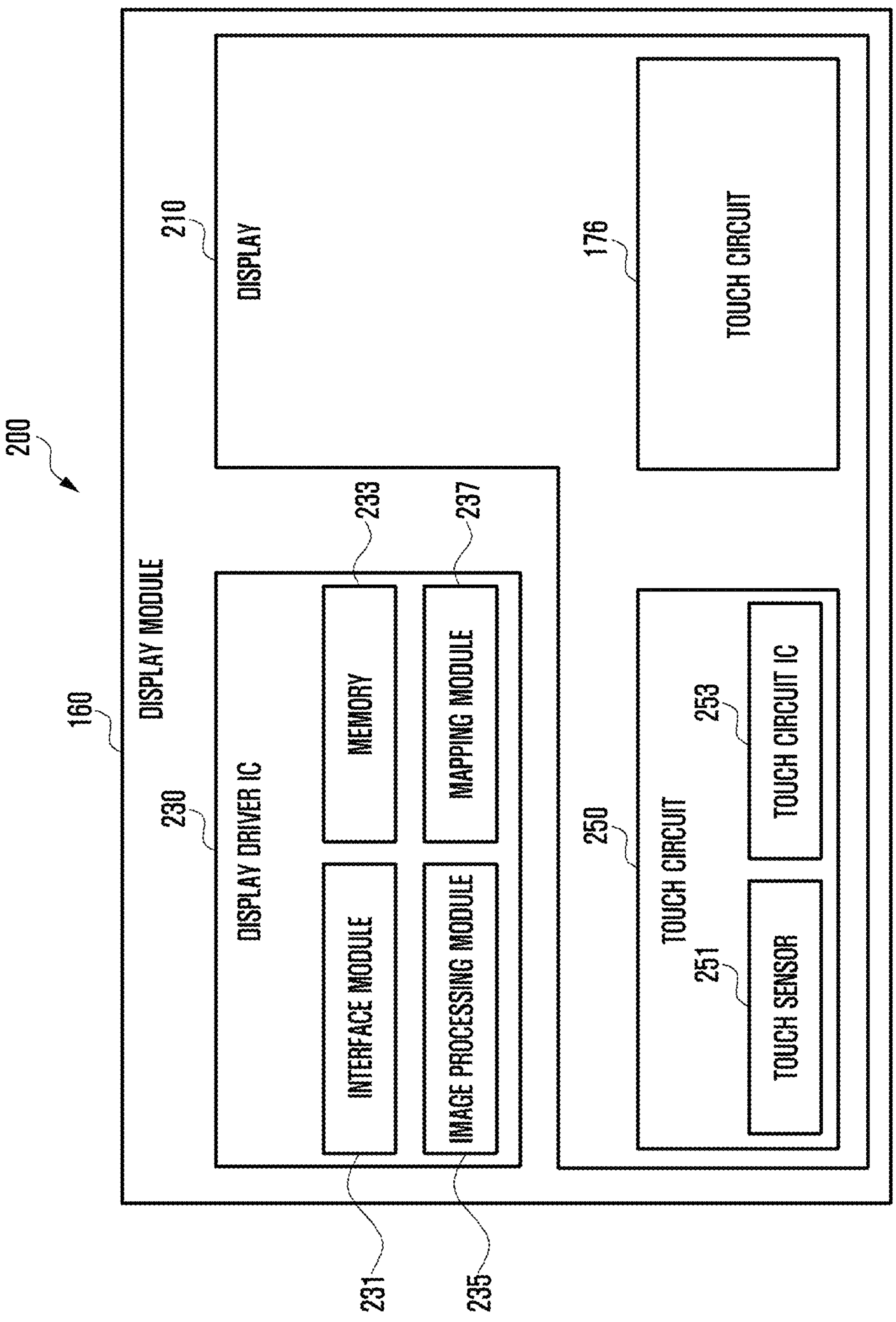
FIG. 2 is a block diagram illustrating a display module according to an embodiment of the disclosure.

FIG. 2 is a block diagram 200 illustrating a display module 160 according to an embodiment of the disclosure.

With reference to FIG. 2, a display module 160 may include a display 210 and a display driver IC (DDI) 230 for controlling a display 210. The DDI 230 may include an interface module 231, memory 233 (e.g., a buffer memory 350), an image processing module 235, or a mapping module 237. The DDI 230 may receive, for example, image information including image data or image control signals corresponding to commands for controlling the image data from other components of an electronic device 101 through the interface module 231. For example, according to an embodiment, the image information may be received from a processor 120 (e.g., a main processor 121 (e.g., application processor) or an auxiliary processor 123 (e.g., graphics processor) for operating independently of a function of a main processor 121. The DDI 230 may communicate with the touch circuit 250 or a sensor module 176 through an interface module 231. The DDI 230 may store at least a portion of the received image information, for example, in units of frames in the memory 233. An image processing module 235 may perform, for example, preprocessing or postprocessing (e.g., resolution, brightness, or size adjustment) on at least a portion of the image data based on at least characteristics of the image data or characteristics of the display 210. The mapping module 237 may generate a voltage value or a current value corresponding to the image data preprocessed or postprocessed through the image processing module 135. According to an embodiment, the generation of a voltage value or a current value may be performed based on at least a part of, for example, properties of pixels (e.g., arrangement of pixels (RGB stripe or pentile structure) of the display 210, or a size of each of sub-pixels). At least some pixels of the display 210 may be driven based on at least a part of, for example, the voltage value or the current value; thus, visual information (e.g., text, image, or icon) corresponding to the image data may be displayed through the display 210.

According to another embodiment, the display module 160 may further include a touch circuit 250. The touch circuit 250 may include a touch sensor 251 and a touch sensor IC 253 for controlling the touch sensor 251. For example, the touch sensor IC 253 may control the touch sensor 251, for example, to detect a touch input or a hovering input for a specific position of the display 210. In another example, the touch sensor IC 253 may measure a change in a signal (e.g., voltage, light amount, resistance, or charge amount) for a specific position of the display 210 to detect a touch input or a hovering input. The touch sensor IC 253 may provide information (e.g., position, area, pressure, or time) on the detected touch input or hovering input to the processor 120. At least a portion (e.g., the touch sensor IC 253) of the touch circuit 250 may be included as a part of the display driver IC (DDI) 230 or the display 210, or as a part of other components (e.g., the auxiliary processor 123) disposed outside the display module 160.

According to yet another embodiment, the display module 160 may further include at least one sensor (e.g., fingerprint sensor, iris sensor, pressure sensor, or illumination sensor) of the sensor module 176, or a control circuit therefor. In this case, the at least one sensor or the control circuit therefor may be embedded in a part (e.g., the display 210 or the DDI 230) of the display module 160 or a part of the touch circuit 250. For example, in the case that the sensor module 176 embedded in the display module 160 includes a biometric sensor (e.g., fingerprint sensor), the biometric sensor may acquire biometric information (e.g., fingerprint image) associated with a touch input through a partial area of the display 210. In another example, in the case that the sensor module 176 embedded in the display module 160 includes a pressure sensor, the pressure sensor may acquire pressure information associated with a touch input through a partial area or the entire area of the display 210. According to an embodiment, the touch sensor 251 or the sensor module 176 may be disposed between pixels of a pixel layer of the display 210, or over or under the pixel layer.

Figure 3:
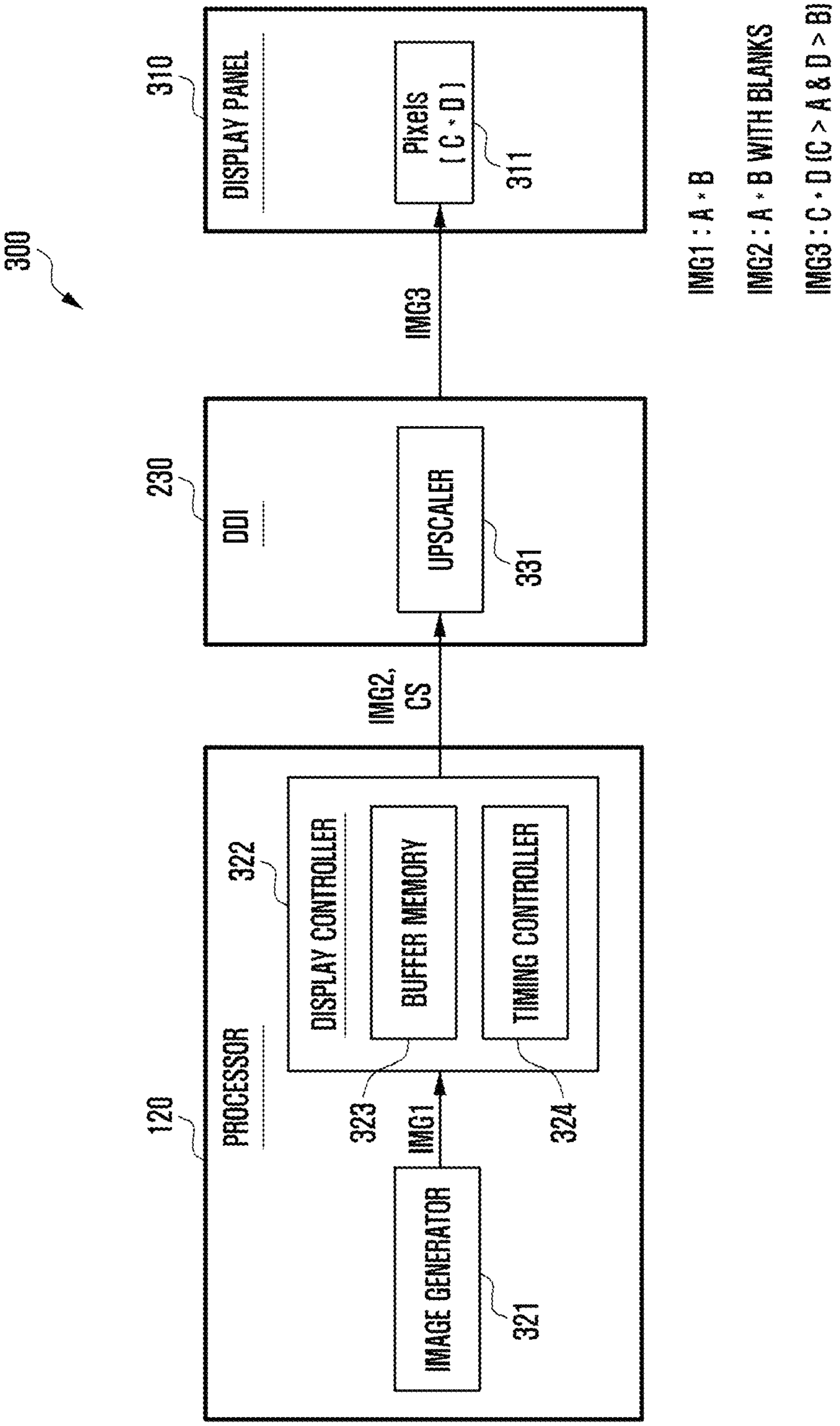
FIG. 3 is a block diagram illustrating at least a portion of an electronic device according to an embodiment of the disclosure.

FIG. 3 is a block diagram illustrating at least a portion of an electronic device 300 according to an embodiment of the disclosure.

The electronic device 300 illustrated in FIG. 3 may be at least partially similar to or substantially the same as the electronic device 300 illustrated in FIG. 1.

The electronic device 300 may include a processor 120, a DDI 230, or a display panel 310. The display panel 310 may be at least partially similar to or substantially the same as the display 210 illustrated in FIG. 2.

According to one embodiment, the processor 120 may include an image generator 321, a buffer memory 323, or a timing controller 324. According to an embodiment, the buffer memory 323 and the timing controller 324 may be composed of individual components or may be integrated into one module. For example, the processor 120 may include a display controller 322 including a buffer memory 323 and a timing controller 324. The term "display controller 322" referred to in the disclosure is only one example and the disclosure is not limited thereto, and the term "display controller 322" may be changed to various terms.

According to another embodiment, the image generator 321 may generate image data (e.g., first image data IMG1) to be displayed through the display panel 310 based on an application executed in the electronic device 300. In the case that the electronic device 300 is configured to perform an upscaling operation, the image generator 321 may generate image data (e.g., first image data IMG1) corresponding to a resolution smaller than an output resolution of the display panel 310. In the case that the electronic device 300 is configured not to perform an upscaling operation, the image generator 321 may generate image data corresponding to an output resolution of the display panel 310. The electronic device 300 may activate or deactivate a configuration for performing an upscaling operation based on a user input. For example, the electronic device 300 may be configured to activate an upscaling operation based on a user input and to enable the image generator 321 of the processor 120 to generate image data (e.g., first image data IMG1) corresponding to a resolution smaller than the output resolution of the display panel 310 based on the upscaling operation being activated.

According to still another embodiment, the image generator 321 may generate first image data IMG1 corresponding to the first resolution based on the executed application. The first resolution (e.g., A*B) may be a resolution smaller than a second resolution (e.g., C*D), which is the output resolution of the display panel 310. The image generator 321 may provide the generated first image data IMG1 to the display controller 322. The first resolution and the second resolution may be configured to have a designated ratio. The designated rate may be a rate at which the DDI 230 performs upscaling of image data input from the processor 120, and the rate may be changed to various values.

According to an embodiment, the buffer memory 323 of the display controller 322 may store first image data IMG1. The buffer memory 323 may be a frame buffer or a line buffer.

The timing controller 324 of the display controller 322 may adjust output timing of the first image data IMG1 based on the upscaling operation being activated and add a blank section (e.g., a blank section BL of FIG. 5A) to at least some sections of the first image data IMG1 to generate second image data IMG2. In the case that the upscaling operation is deactivated, the timing controller 324 may not adjust the output timing of image data generated by the image generator 321, but provide image data to the DDI 230 based on a synchronization signal corresponding to the output resolution of the display panel 310.

Adjusting the output timing of the first image data IMG1 may mean controlling the flow (e.g., speed) at which the first image data IMG1 is transferred from the processor 120 to the DDI 230. For example, in the case that the first resolution is an HD resolution (e.g., 1280*720) and that the second resolution, which is the output resolution of the display panel 310, is a wide quad high definition (WQHD) resolution (e.g., 2560*1440), the timing controller 324 may perform the flow control that transfers first image data IMG1 of one horizontal line per two horizontal line timing (e.g., two horizontal periods). For example, in the case that the first resolution is an HD resolution and that the second resolution, which is the output resolution of the display panel 310, is a WQHD resolution, the timing controller 324 may perform the flow control that transfers first image data IMG1 corresponding to one pixel per two horizontally adjacent pixel timings (e.g., 2 clock sections).

The electronic device 300 adjusts, for example, the output timing of image data for upscaling in advance in the processor 120 and transmits it to the DDI 230; thus, the DDI 230 configured to operate based on a video mode may perform upscaling without including memory. The electronic device 300 according to the disclosure can reduce power consumption. Further, because the electronic device 300 according to the disclosure does not need to consider a delay involved in adjusting data timing in the DDI 230, the electronic device 300 does not generate a separate frame delay when switching a resolution (e.g., upscaling on/off or magnification switching); thus, seamless resolution switching is possible.

The timing controller 324 may provide a control signal CS to the DDI 230 based on the upscaling operation being activated. The control signal CS may be a signal notifying an upscaler 331 of the DDI 230 whether an upscaling operation is performed or a signal notifying the change in resolution of image data transmitted from the processor 120 to the DDI 230. The timing controller 324 may perform a synchronization operation so that the control signal CS and the second image data IMG2 are transmitted in pairs. For example, the timing controller 324 may transmit the control signal CS every frame in which the second image data IMG2 is transmitted. Alternatively, the timing controller 324 may transmit the control signal CS only once in synchronization with the start of activation of the upscaling operation from the processor 120, and transmit the control signal CS only once in synchronization with the upscaling operation being deactivated.

According to another embodiment, the timing controller 324 may change a horizontal synchronization signal Hsync based on a designated ratio, which is a relative ratio of the first resolution and the second resolution based on the upscaling operation being activated. The timing controller 324 may change a first horizontal synchronization signal (e.g., a first horizontal synchronization signal Hsync1 of FIG. 4) corresponding to the first resolution to a second horizontal synchronization signal (e.g., a second horizontal synchronization signal Hsync2 of FIG. 5A) corresponding to the second resolution based on the designated ratio. For example, in the case that the first resolution is an HD resolution and that the second resolution, which is an output resolution of the display panel 310, is a WQHD resolution, the timing controller 324 may configure a frequency of the second horizontal synchronization signal Hsync2 to be twice that of the first horizontal synchronization signal Hsync1.

According to yet another embodiment, the timing controller 324 may adjust a length of each transmission section of the first image data IMG1 based on the second horizontal synchronization signal Hsync2. The timing controller 324 may adjust a length of the transmission section of the first image data IMG1 so that a portion of the first image data IMG1 corresponding to one horizontal line is transmitted in synchronization with the second horizontal synchronization signal Hsync2.

The timing controller 324 may convert the first image data IMG1 into the second image data IMG2 by adding a blank section BL between at least some sections of transmission sections of the first image data IMG1. Accordingly, the second image data IMG2 is image data corresponding to the first resolution, but a length of each section in which data corresponding to one horizontal line is transmitted may be adjusted to correspond to the second horizontal synchronization signal Hsync2 and each section includes a blank section BL, thereby having a data flow corresponding to the second resolution.

An image corresponding to the first image data IMG1 and an image corresponding to the second image data IMG2 may be substantially the same. For example, image information in which the first image data IMG1 wants to display and image information in which the second image data IMG2 wants to display may be the same. The first image data IMG1 and the second image data IMG2 are the same image data, but the transmission timing, transmission period, or transmission rate at which the data is transmitted may be different. In an example, the second image data IMG2 includes the same image as that of the first image data IMG1, but the first image data IMG1 has first transmission timing, and the second image data IMG2 may have second transmission timing different from the first transmission timing. For example, the second image data IMG2 includes the same image as that of the first image data IMG1, but the first image data IMG1 has a first transmission period, and the second image data IMG2 may have a second transmission period different from the first transmission period. For example, the second image data IMG2 includes the same image as that of the first image data IMG1, but the first image data IMG1 may have a first transmission rate, and the second image data IMG2 may have a second transmission rate different from the first transmission rate.

The second image data IMG2 referred to in the disclosure may be interpreted as "image data obtained by adjusting at least one of the transmission timing, transmission period, or transmission rate of the first image data IMG1."

In an embodiment, as will be described later with reference to FIG. 5B, the timing controller 324 may not change the horizontal synchronization signal Hsync based on the upscaling operation being activated. The timing controller 324 may convert the first image data IMG1 into the second image data IMG2 and provide the converted second image data IMG2 to the upscaler 331 of the DDI 230. In the case that the timing controller 324 provides the second image data IMG2 to the upscaler 331 of the DDI 230 without changing the horizontal synchronization signal Hsync, the upscaler 331 may change the horizontal synchronization signal Hsync based on a designated ratio, which is a relative ratio of the first resolution and the second resolution. For example, the upscaler 331 may change a first horizontal synchronization signal (e.g., a first horizontal synchronization signal Hsync1 of FIG. 4) corresponding to the first resolution to a second horizontal synchronization signal (e.g., a second horizontal synchronization signal Hsync2 of FIG. 5A) corresponding to the second resolution based on a designated ratio.

In another embodiment, the DDI 230 may include an upscaler 331 for converting second image data IMG2 input from the processor 120 into third image data IMG3 corresponding to a second resolution larger than the first resolution by a designated ratio. The DDI 230 may drive the display panel 310 so that the display panel 310 displays the third image data IMG3 converted by the upscaler 331.

The DDI 230 may be configured to drive the display panel 310 based on the video mode. For example, the DDI 230 may not include a buffer memory 323 for storing image data, for example, second image data IMG2 input from the processor 120.

In yet another embodiment, the display panel 310 may include a plurality of pixels 311 having a designated resolution, for example, a second resolution. The plurality of pixels 311 may be arranged in a matrix form, and the DDI 230 may be driven so that a plurality of pixels 311 arranged in a matrix form display third image data IMG3 based on a horizontal synchronization signal (e.g., a second horizontal synchronization signal Hsync2 of FIG. 6) and a vertical synchronization signal (e.g., a vertical synchronization signal Vsync of FIG. 6).

Figure 4:
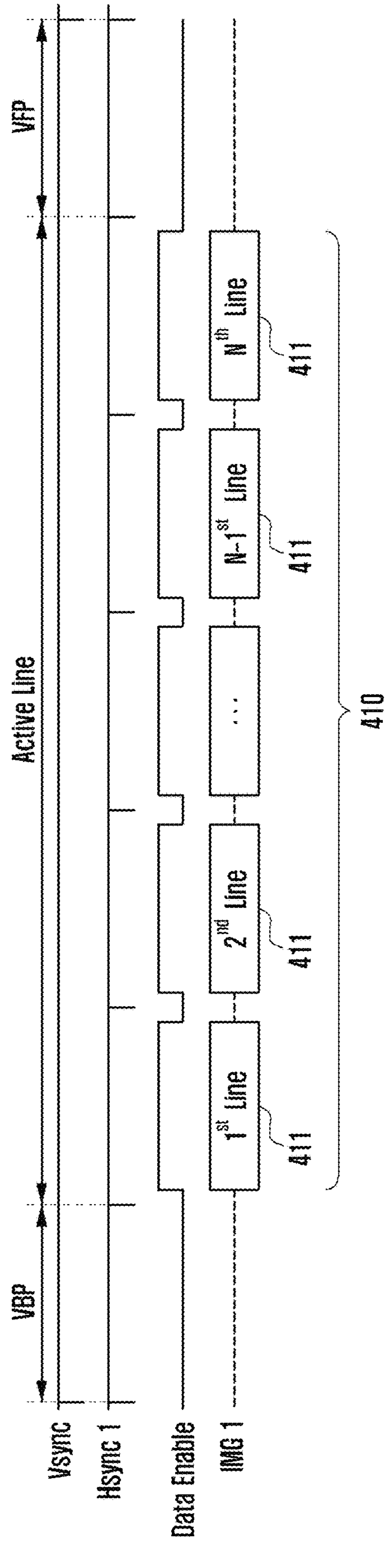
FIG. 4 illustrates an example of first image data input to a timing controller according to an embodiment of the disclosure.

FIG. 4 illustrates an example of first image data IMG1 input to a timing controller 324 according to an embodiment of the disclosure.

Figure 5A:
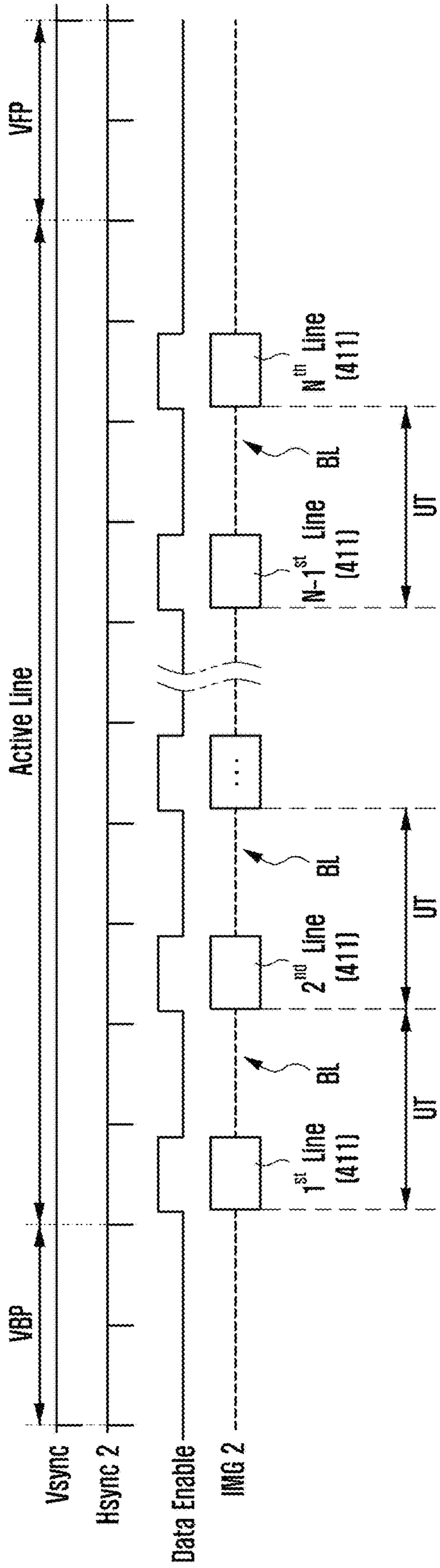
FIG. 5A illustrates an example of second image data provided from a timing controller to an upscaler of a display driver IC (DDI) according to an embodiment of the disclosure.

FIG. 5A illustrates an example of second image data IMG2 provided from a timing controller 324 to an upscaler 331 of the DDI 230 according to an embodiment of the disclosure.

Figure 5B:
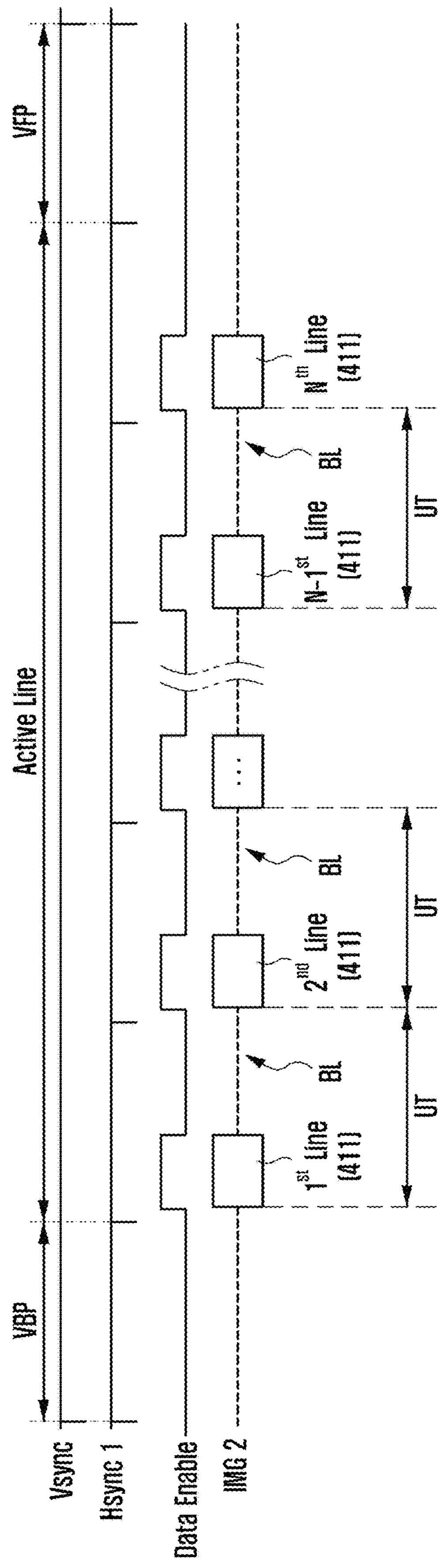
FIG. 5B illustrates an example of second image data provided from a timing controller to an upscaler of a DDI according to an embodiment of the disclosure.

FIG. 5B illustrates an example of second image data IMG2 provided from a timing controller 324 to an upscaler 331 of the DDI 230 according to an embodiment of the disclosure.

Figure 6:
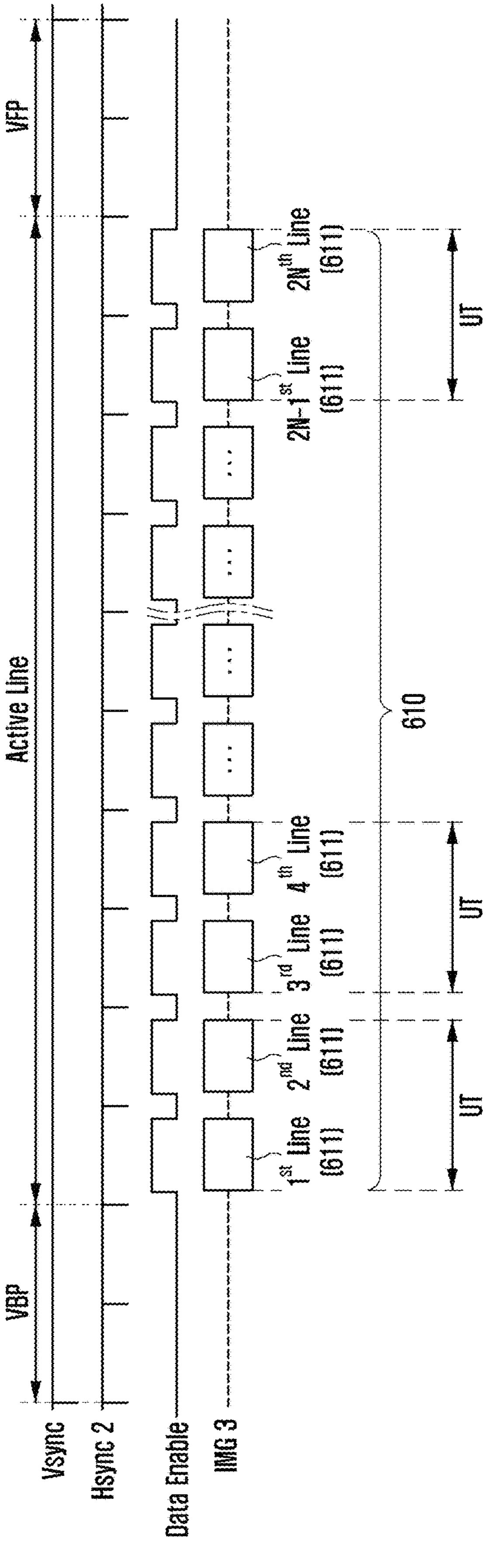
FIG. 6 illustrates an example of third image data provided from a DDI upscaler to a display panel according to an embodiment of the disclosure.

FIG. 6 illustrates an example of third image data IMG3 provided from an upscaler 331 of a DDI 230 to a display panel 310 according to an embodiment of the disclosure.

In FIGS. 4, 5A, 5B, and 6, "Vsync" may mean a vertical synchronization signal Vsync, and the vertical synchronization signal Vsync may be a synchronization signal that defines one frame section.

In FIGS. 4, 5A, 5B, and 6, "Hsync 1" may mean a first horizontal synchronization signal Hsync1, and the first horizontal synchronization signal Hsync1 may be a synchronization signal that defines one horizontal period when displaying image data according to a first resolution. "Hsync 2" may mean a second horizontal synchronization signal Hsync2, and the second horizontal synchronization signal Hsync2 may be a synchronization signal that defines one horizontal period when displaying image data according to a second resolution. One horizontal period may mean a period in which data is supplied to pixels corresponding to one horizontal line (e.g., pixels arranged in each row) among a plurality of pixels 311 of the display panel 310.

In FIGS. 4, 5A, 5B, and 6, "data enable" may mean a data enable signal, and the display panel 310 may supply data to pixels corresponding to one horizontal line among a plurality of pixels 311 of the display panel 310 in response to the data enable signal.

In FIGS. 4, 5A, 5B, and 6, "display data" may be data (e.g., one horizontal line data) for each line of third image data IMG3 provided from the upscaler 331 of the DDI 230 to the display panel 310. Data for each line of the third image data IMG3 may be supplied to pixels corresponding to one horizontal line in response to a data enable signal.

In FIGS. 4, 5A, 5B, and 6, an "active line" is a section between a vertical back porch (VBP) section and a vertical front porch (VFP) section and may mean a section in which image data corresponding to one frame is transmitted to a plurality of pixels 311.

With reference to FIG. 4, first image data IMG1 generated by the image generator 321 of the processor 120 may be image data corresponding to a first resolution, and may include image data 410 of the N number of horizontal lines. The N number of horizontal line image data 410 may include one horizontal line data 411 transmitted in synchronization with the first horizontal synchronization signal Hsync1 corresponding to the first resolution.

With reference to FIG. 5A, according to an embodiment, second image data IMG2 provided from the timing controller 324 of the processor 120 to the upscaler 331 of the DDI 230 includes the N number of horizontal line image data corresponding to the first resolution, but a length of each section in which one horizontal line data 411 is transmitted is adjusted to correspond to a second horizontal synchronization signal Hsync2 and each section includes a blank section BL, thereby having a data flow corresponding to the second resolution. In an example, a section length of a second horizontal synchronization signal Hsync2 illustrated in FIG. 5A may be configured shorter than that of the first horizontal synchronization signal Hsync1 illustrated in FIG. 4, and the configuration may be adjusted according to a designated ratio according to the first resolution and the second resolution.

With reference to FIG. 5B, according to an embodiment, the timing controller 324 may not change the horizontal synchronization signal Hsync based on an upscaling operation being activated. For example, the timing controller 324 may convert first image data IMG1 having a data flow corresponding to the first resolution into second image data IMG2 having a data flow corresponding to the second resolution, but may not change the synchronization signal Hsync. The processor 120 may control the DDI 230 to change the horizontal synchronization signal Hsync. The upscaler 331 of the DDI 230 may change the horizontal synchronization signal Hsync based on a designated ratio, which is a relative ratio of the first resolution and the second resolution. The upscaler 331 may change a first horizontal synchronization signal (e.g., a first horizontal synchronization signal Hsync1 of FIG. 4) corresponding to the first resolution to a second horizontal synchronization signal (e.g., a second horizontal synchronization signal Hsync2 of FIG. 5A) corresponding to the second resolution based on a designated ratio.

According to an embodiment, when converting the first image data IMG1 into the second image data IMG2, the timing controller 324 may divide transmission sections of the first image data IMG1 into a plurality of unit sections UT in which horizontal line data of the first image data IMG1 are arranged according to a designated rule. Each of the plurality of unit sections UT may include at least one blank section BL between one horizontal line data 410 of the first image data IMG1. Each of the plurality of unit sections UT may have a total length of the K1 number of horizontal periods based on the designated magnification, and include K2 number of horizontal line data and (K1−K2) number of blank sections BL. The designated magnification for converting the first image data IMG1 into the second image data IMG2 may be K1/ K2. For example, in the case that the first resolution is an HD resolution and that the second resolution, which is an output resolution of the display panel 310, is a WQHD resolution, the designated magnification may be 2/1.

In various embodiments, when the electronic device 300 performs an upscaling operation, the unit section UT may be the smallest unit in which the timing controller 324 of the processor 120 transmits image data to the DDI 230. Unit sections (UTs) transmitted from the timing controller 324 to the DDI 230 may be transmitted with repeated rules. The size of each unit section UT may be multiplication of M horizontal periods in the case that an upscaling magnification is M/N. For example, in the case that the upscaling magnification is M/N, the size of each unit section UT may be configured to M horizontal period, 2M horizontal period, or 3M horizontal period.

In other embodiments, the blank section BL may mean a section in which image data is not transferred among horizontal periods within the unit section UT. The number of blank sections BL within each unit section UT may be the number corresponding to multiplication of (M−N) in the case that an upscaling magnification is M/N. For example, in the case that the size of each unit section UT is M horizontal period, the number of blank sections BL may be M−N. For example, in the case that the size of each unit section UT is 2M horizontal period, the number of blank sections BL may be 2*(M−N). For example, in the case that the size of each unit section UT is 3M horizontal period, the number of blank sections BL may be 3*(M−N).

FIG. 5A illustrates that a designated ratio of a second resolution to a first resolution is 2/1, and the timing controller 324 may perform the flow control that transfers first image data IMG1 of one horizontal line per two horizontal line timing (e.g., two horizontal periods). Although not illustrated, in the case that the first resolution is a HD resolution and that the second resolution, which is an output resolution of the display panel 310, is a WQHD resolution, the timing controller 324 may perform the flow control that transfers second image data IMG2 corresponding to one pixel per two horizontally adjacent pixel timings (e.g., 2 clock sections).

With reference to FIG. 6, the upscaler 331 of the DDI 230 may receive an input of second image data IMG2 including a blank section BL, as illustrated in FIG. 5A and convert the second image data IMG2 into third image data IMG3 according to a designated magnification. In the third image data IMG3, each of a plurality of unit sections UT may have a total length of the M number of horizontal periods 610, and each unit section may include the M number of horizontal line data 611, but may not include a blank section BL.

FIG. 6 illustrates that a designated ratio of a second resolution to a first resolution is 2/1, and the upscaler 331 of the DDI 230 may add horizontal line data to the blank section BL included in the second image data IMG2 to generate image data of the 2N number of horizontal lines.

Figure 7:
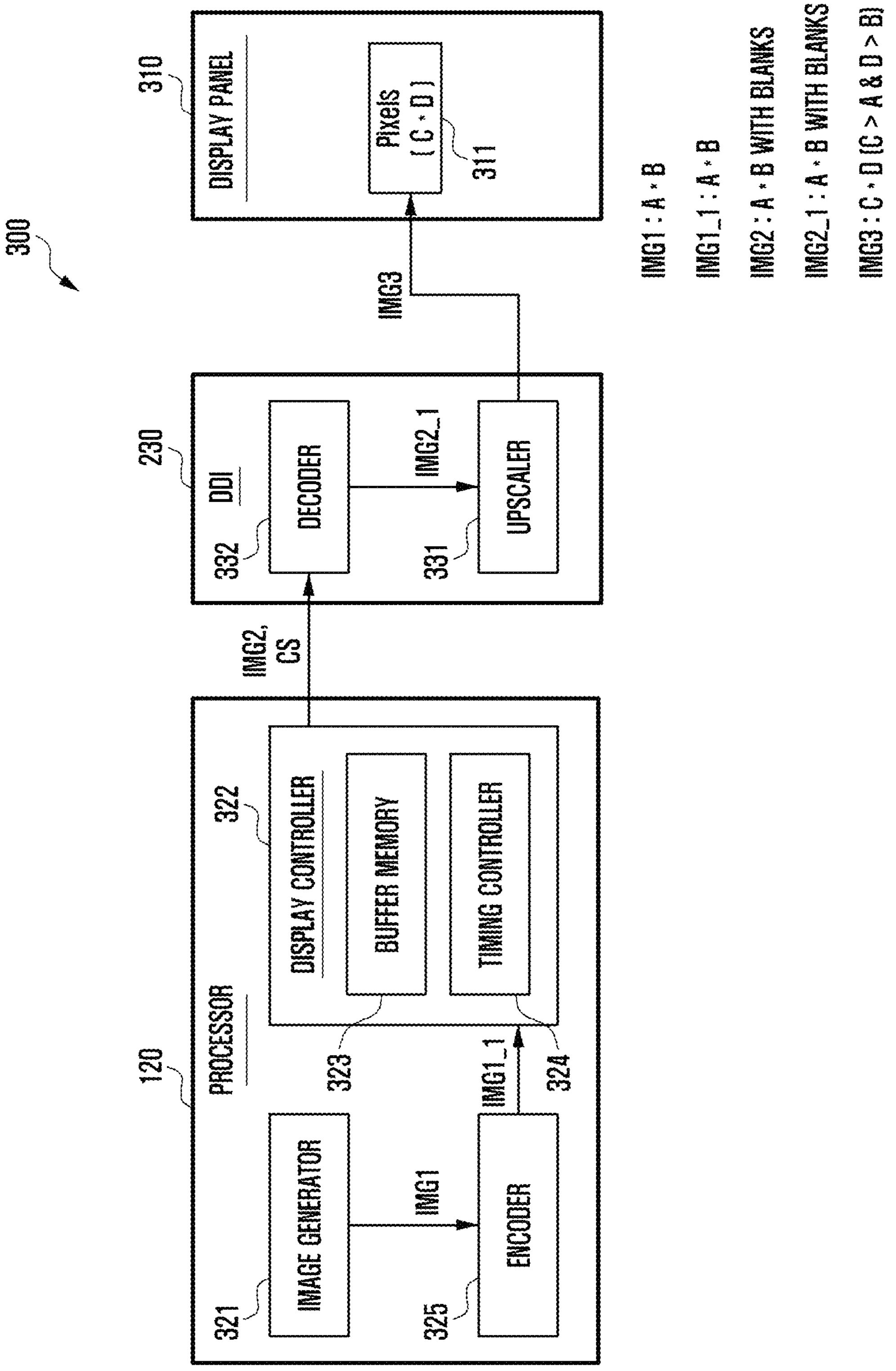
FIG. 7 is a block diagram illustrating at least a portion of an electronic device according to an embodiment of the disclosure.

FIG. 7 is a block diagram illustrating at least a portion of an electronic device 300 according to an embodiment of the disclosure.

The electronic device 300 illustrated in FIG. 7 may be at least partially similar to or substantially the same as the electronic device 300 illustrated in FIG. 1 and the electronic device 300 illustrated in FIG. 3. In the description related to FIG. 7, only components different from or added to the components of FIG. 3 will be described. The description of components not described in relation to FIG. 7 will be replaced with the description of FIG. 3.

With reference to FIG. 7, when the processor 120 transmits image data to the DDI 230, the electronic device 300 according to an embodiment may perform encoding and decoding according to a designated standard. The processor 120 may include an encoder 325 for encoding first image data IMG1 based on a designated standard. According to an embodiment, the DDI 230 may include a decoder 332 for decoding image data input from the processor 120 based on a designated standard. According to another embodiment, the designated standard in which the processor 120 encodes image data may be at least one of DSC or VDC-M.

The image generator 321 may generate first image data IMG1 corresponding to the first resolution based on an executed application and provide the generated first image data IMG1 to the encoder 325. The encoder 325 may receive an input of the first image data IMG1 and encode the first image data IMG1 based on a designated standard. The encoder 325 may provide the encoded first image data IMG1_1 to the timing controller 324 of the display controller 322.

In an embodiment, the timing controller 324 may transmit continuously the designated K number of horizontal line data transmitted first among all horizontal line data (e.g., the N number of horizontal line data) included in the first image data IMG1_1 encoded by the encoder 325 without a blank section BL. The number of the designated K number of horizontal line data may be adjusted according to a designated standard, and the designated K number of horizontal line data may be referred to as "initial buffer lines (IBL)." The K number of horizontal line data (e.g., initial buffer lines (IBL) of FIG. 8A) may be configured in consideration of a delay period and minimum line data required for the DDI 230 to decode image data received from the processor 120. For example, the decoder 332 of the DDI 230 may need to continuously receive a plurality of designated horizontal line data in order to decode one horizontal line data. Taking the above necessary conditions into consideration, the timing controller 324 may transmit continuously the designated K number of horizontal line data transmitted first among all horizontal line data (e.g., the N number of horizontal line data) included in the first image data IMG1 without a blank section BL, and the designated K number of horizontal line data may be referred to as "initial buffer lines (IBL)".

In another embodiment, the decoder 332 of the DDI 230 may receive an input of second image data IMG2 encoded from the processor 120 and decode the second image data IMG2. The decoder 332 may provide the decoded second image data IMG2_1 to the upscaler 331.

In yet another embodiment, the upscaler 331 may convert second image data IMG2_1 received an input from the decoder 332 into third image data IMG3. The DDI 230 may drive the display panel 310 so that the display panel 310 displays the third image data IMG3 converted by the upscaler 331. For example, the DDI 230 may supply third image data IMG3 to a plurality of pixels 311 of the display panel 310 based on a synchronization signal, for example, a second horizontal synchronization signal Hsync2 (or data enable signal) corresponding to the second resolution.

Figure 8A:
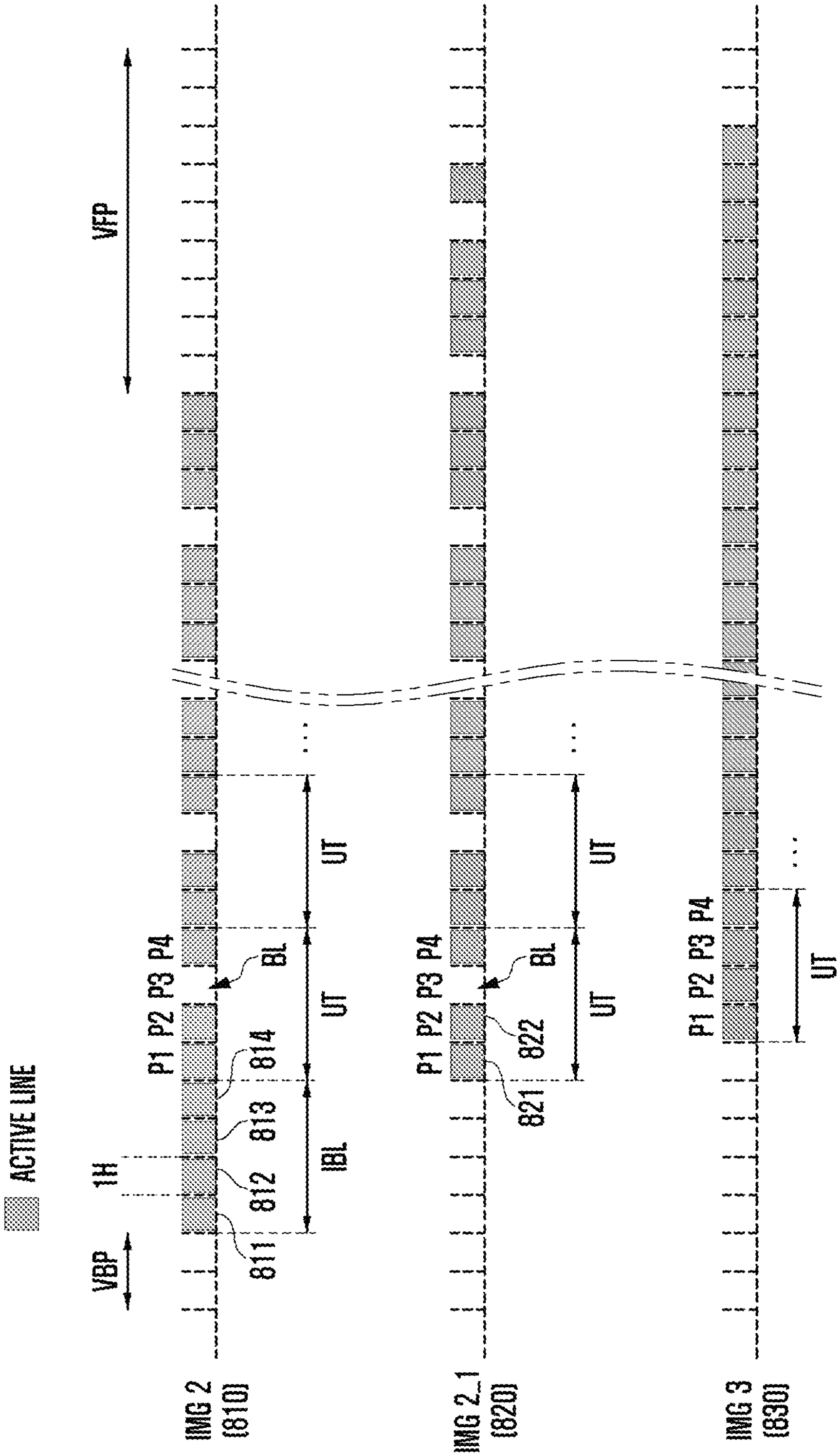
FIG. 8A illustrates an example of an operation in which a DDI decodes input image data and performs upscaling of an input image data according to a designated first ratio when a processor transmits encoded image data to the DDI according to an embodiment of the disclosure.

FIG. 8A illustrates an example of an operation in which a DDI 230 decodes input image data and performs upscaling of an input image data according to a designated first ratio when a processor 120 transmits encoded image data to the DDI 230 according to an embodiment of the disclosure.

For example, a first ratio designated in FIG. 8A may be 4/3, and the upscaler 331 of the DDI 230 may perform upscaling of a resolution of second image data IMG2 input from the processor 120 to increase by 4/3 times to generate third image data IMG3.

In FIG. 8A, a waveform diagram 810 illustrates second image data IMG2 transmitted from the processor 120 to the DDI 230. In FIG. 8A, a waveform diagram 820 illustrates second image data IMG2_1 decoded by the decoder 332 of the DDI 230 to be input to the upscaler 331. In FIG. 8A, a waveform diagram 830 illustrates third image data IMG3 generated by the upscaler 331.

In each of the waveform diagram 810, the waveform diagram 820, and the waveform diagram 830 of FIG. 8A, a horizontal length of each section divided by a vertical dotted line may, for example, mean one horizontal period (1H) corresponding to an output resolution of the display panel 310. For example, in the waveform diagram 810 of FIG. 8A, two consecutive sections may be two horizontal periods corresponding to the output resolution of the display panel 310.

In each of the waveform diagrams 810, 820, and 830 of FIG. 8A, a section including shading (or hatching) may represent a section in which one horizontal line data is transmitted. In each of the waveform diagrams 810, 820, and 830 of FIG. 8A, a section that does not include shading (or hatching) may represent a blank section BL in which one horizontal line data is not transmitted.

With reference to the waveform diagram 810 of FIG. 8A, the timing controller 324 of the processor 120 may configure the designated K number of horizontal line data transmitted first among all horizontal line data included in the second image data IMG2 into "initial buffer lines (IBL)" transmitted continuously without a blank section BL. In the example of FIG. 8A, "initial buffer lines (IBL)" may be four designated horizontal line data transmitted first among all horizontal line data included in the second image data IMG2. In an example, the decoder 332 of the DDI 230 may need to continuously receive three horizontal line data in order to decode one horizontal line data. Taking the above necessary conditions into consideration, the timing controller 324 may continuously transmit four designated horizontal line data transmitted first among all horizontal line data included in the first image data IMG1 without a blank section BL. The above numerical values are only an example and the disclosure is not limited thereto.

The timing controller 324 of the processor 120 may divide the remaining horizontal line data excluding horizontal line data corresponding to "initial buffer lines (IBL)" into a plurality of unit sections UT. In the plurality of unit sections UT, horizontal line data and a blank section BL may be arranged according to a certain rule. For example, each of the plurality of unit sections UT configured by the timing controller 324 may have a total length of four horizontal periods and include three horizontal line data and one blank section BL. In the case that four horizontal periods included in one unit section UT are defined as a first period P1, a second period P2, a third period P3, and a fourth period P4, the timing controller 324 may configure any one of the first to fourth periods P1, P2, P3, and P4 as the blank section BL. In the illustrated example, the third period P3 of each unit section UT is schematized as a blank section BL, but an embodiment according to the disclosure is not limited thereto. For another example, the blank section BL may be arranged in any one of the first period P1, the second period P2, or the fourth period P4 in addition to the third period P3.

With reference to the waveform diagram 820 of FIG. 8A, the decoder 332 of the DDI 230 may decode second image data IMG2 input from the processor 120 according to a designated standard and provide the decoded second image data IMG2_1 to the upscaler 331. According to an embodiment, the second image data IMG2_1 decoded by the decoder 332 may include a plurality of unit sections UT, and each unit section UT may have a total length of four horizontal periods according to a designated first ratio for an upscaling operation and include 3 horizontal line data and 1 blank section BL. According to another embodiment, first horizontal line data 821 output first among second image data IMG2_1 decoded by the decoder 332 may be data decoded based on the first to third horizontal line data 811, 812, and 813 among horizontal line data of "initial buffer lines (IBL)" output from the timing controller 324. For example, the horizontal line data 821 first output in the waveform diagram 820 of FIG. 8A may be data decoded based on three consecutive horizontal line data 811, 812, and 813 first output in the waveform diagram 810 of FIG. 8A.

According to one embodiment, second horizontal line data 822 output second among second image data IMG2_1 decoded by the decoder 332 may be data decoded based on the second to fourth horizontal line data 812, 813, and 814 among horizontal line data of "initial buffer lines (IBL)" output from the timing controller 324. For example, horizontal line data 822 output second in the waveform diagram 820 of FIG. 8A may be data decoded from the second horizontal line data based on three consecutive horizontal line data 812, 813, and 814 in the waveform diagram 810 of FIG. 8A. The decoder 332 may decode the remaining horizontal line data based on three consecutive horizontal line data input sequentially, similar to the examples described above.

With reference to the waveform diagram 830 of FIG. 8A, the upscaler 331 of the DDI 230 may generate the M number of Horizontal line data using the N number of horizontal line data included in each of the plurality of unit sections UT of the second image data IMG2. For example, the upscaler 331 of the DDI 230 may generate four horizontal line data using three horizontal line data included in each unit, thereby generating third consecutive image data IMG3 without a blank section BL.

Figure 8B:
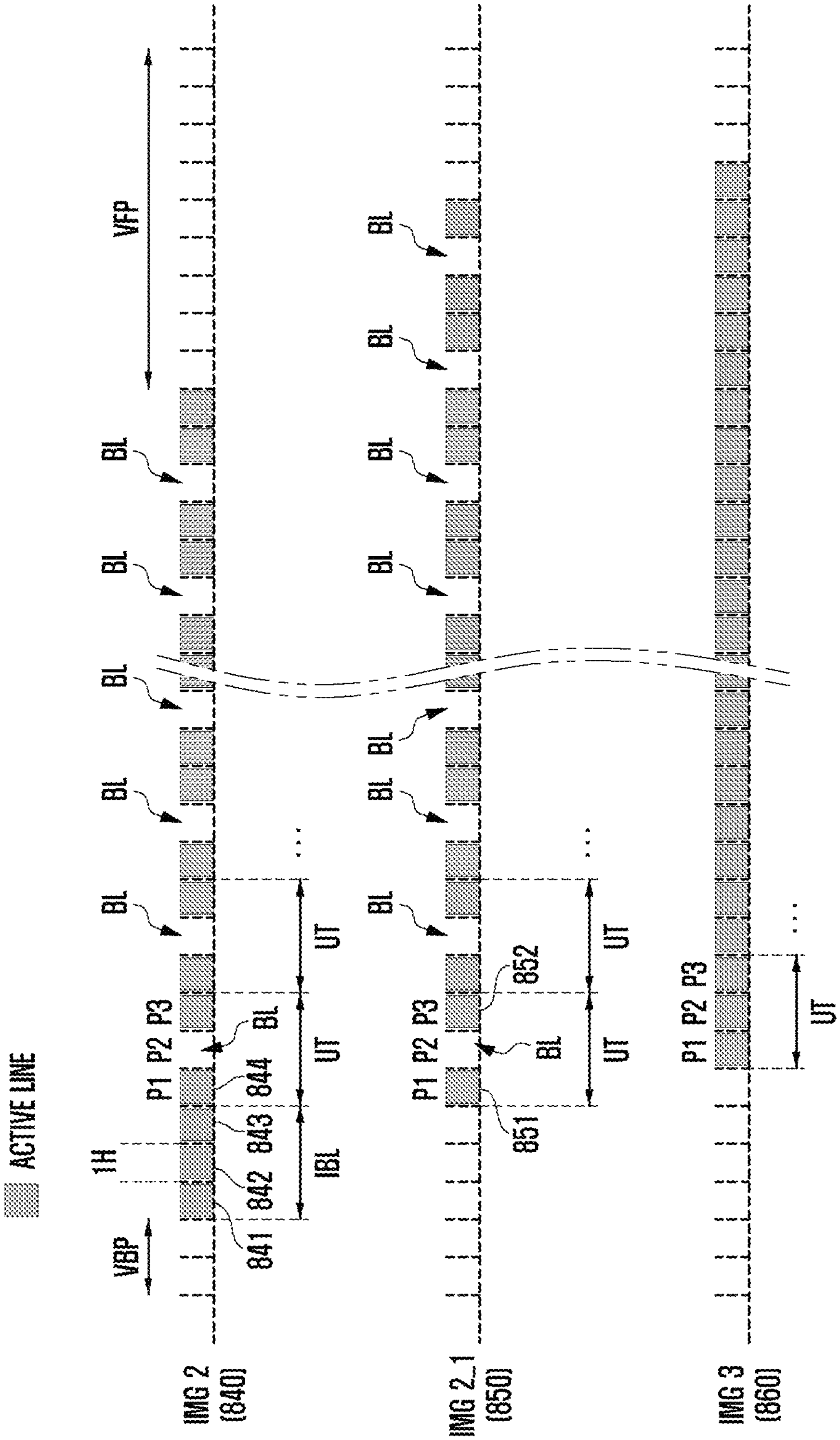
FIG. 8B illustrates an example of an operation in which a DDI decodes input image data and performs upscaling of an input image data according to a designated second ratio when a processor transmits encoded image data to the DDI according to an embodiment of the disclosure.

FIG. 8B illustrates an example of an operation in which a DDI 230 decodes input image data and performs upscaling of an input image data according to a designated second ratio when a processor 120 transmits encoded image data to the DDI 230 according to an embodiment of the disclosure.

For example, the second ratio designated in FIG. 8B may be 3/2, and the upscaler 331 of the DDI 230 may perform upscaling of a resolution of the second image data IMG2 input from the processor 120 to increase by 3/2 times to generate third image data IMG3.

In FIG. 8B, a waveform diagram 840 illustrates second image data IMG2 transmitted from the processor 120 to the DDI 230. In FIG. 8B, a waveform diagram 850 illustrates second image data IMG2_1 decoded by the decoder 332 of the DDI 230 to be input to the upscaler 331. In FIG. 8B, a waveform diagram 860 illustrates third image data IMG3 generated by the upscaler 331.

In each of the waveform diagram 840, the waveform diagram 850, and the waveform diagram 860 of FIG. 8B, a horizontal length of each section divided by a vertical dotted line may mean one horizontal period (1H) corresponding to an output resolution of the display panel 310. In an example, in the waveform diagram 840 of FIG. 8B, two consecutive sections may be two horizontal periods corresponding to the output resolution of the display panel 310.

In each of the waveform diagram 840, the waveform diagram 850, and the waveform diagram 860 of FIG. 8B, a section including shading (or hatching) may, for example, represent a section in which one horizontal line data is transmitted. In each of the waveform diagram 840, the waveform diagram 850, and the waveform diagram 860 of FIG. 8B, a section that does not include shading (or hatching) may represent a blank section BL in which one horizontal line data is not transmitted.

With reference to the waveform diagram 840 of FIG. 8B, the timing controller 324 of the processor 120 may configure the designated K number of horizontal line data transmitted first among all horizontal line data included in the second image data IMG2 to "initial buffer lines (IBL)" transmitted continuously without a blank section BL. In the example of FIG. 8B, "initial buffer lines (IBL)" may be three designated horizontal line data transmitted first among all horizontal line data included in the second image data IMG2. For example, the decoder 332 of the DDI 230 may need to continuously receive three horizontal line data in order to decode one horizontal line data. Taking the above necessary conditions into consideration, the timing controller 324 may continuously transmit three designated horizontal line data transmitted first among all horizontal line data included in the first image data IMG1 without a blank section BL. The above numerical values are only an example and the disclosure is not limited thereto.

The timing controller 324 of the processor 120 may divide the remaining horizontal line data excluding horizontal line data corresponding to "initial buffer lines (IBL)" into a plurality of unit sections UT. In the plurality of unit sections UT, horizontal line data and a blank section BL may be arranged according to a certain rule. For example, each of the plurality of unit sections UT configured by the timing controller 324 may have a total length of three horizontal periods and include two horizontal line data and one blank section BL. In the case that three horizontal periods included in one unit section UT are defined as a first period P1, a second period P2, and a third period P3, the timing controller 324 may configure any one of the first period to third period P1, P2, and P3 as the blank section BL. In the illustrated example, the second period P2 of each unit section UT is schematized as a blank section BL, but an embodiment according to the disclosure is not limited thereto. For example, the blank section BL may be arranged in any one of the first period P1 or the third period P3 in addition to the second period P2.

With reference to the waveform diagram 850 of FIG. 8B, the decoder 332 of the DDI 230 may decode second image data IMG2 input from the processor 120 according to a designated standard, and provide the decoded second image data IMG2_1 to the upscaler 331. According to an embodiment, the second image data IMG2_1 decoded by the decoder 332 may include a plurality of unit sections UT, and each unit section UT may have a total length of three horizontal periods according to a designated second ratio for an upscaling operation and include two horizontal line data and one blank section BL. According to another embodiment, first horizontal line data 851 output first among the second image data IMG2_1 decoded by the decoder 332 may be data decoded based on first to third horizontal line data 841, 842, and 843 among horizontal line data of the "initial buffer lines (IBL)" output from the timing controller 324. For example, horizontal line data 851 first output in the waveform diagram 850 of FIG. 8B may be data decoded based on three consecutive horizontal line data 841, 842, and 843 first output in the waveform diagram 840 of FIG. 8B.

In an embodiment, second horizontal line data 852 output second among second image data IMG2_1 decoded by the decoder 332 may be data decoded based on second to fourth horizontal line data 842, 843, and 844 among horizontal line data of "initial buffer lines (IBL)" output from the timing controller 324. For example, horizontal line data 852 output second in the waveform diagram 850 of FIG. 8B may be data decoded from the second horizontal line data based on three consecutive horizontal line data 842, 843, and 844 in the waveform diagram 840 of FIG. 8B. The decoder 332 may decode the remaining horizontal line data based on three consecutive horizontal line data input sequentially, similar to the examples described above.

With reference to the waveform diagram 860 of FIG. 8B, the upscaler 331 of the DDI 230 may generate the M number of horizontal line data using the N number of horizontal line data included in each of the plurality of unit sections UT of the second image data IMG2. For example, the upscaler 331 of the DDI 230 may generate three horizontal line data using two horizontal line data included in each unit, thereby generating third consecutive image data IMG3 without a blank section BL.

Figure 8C:
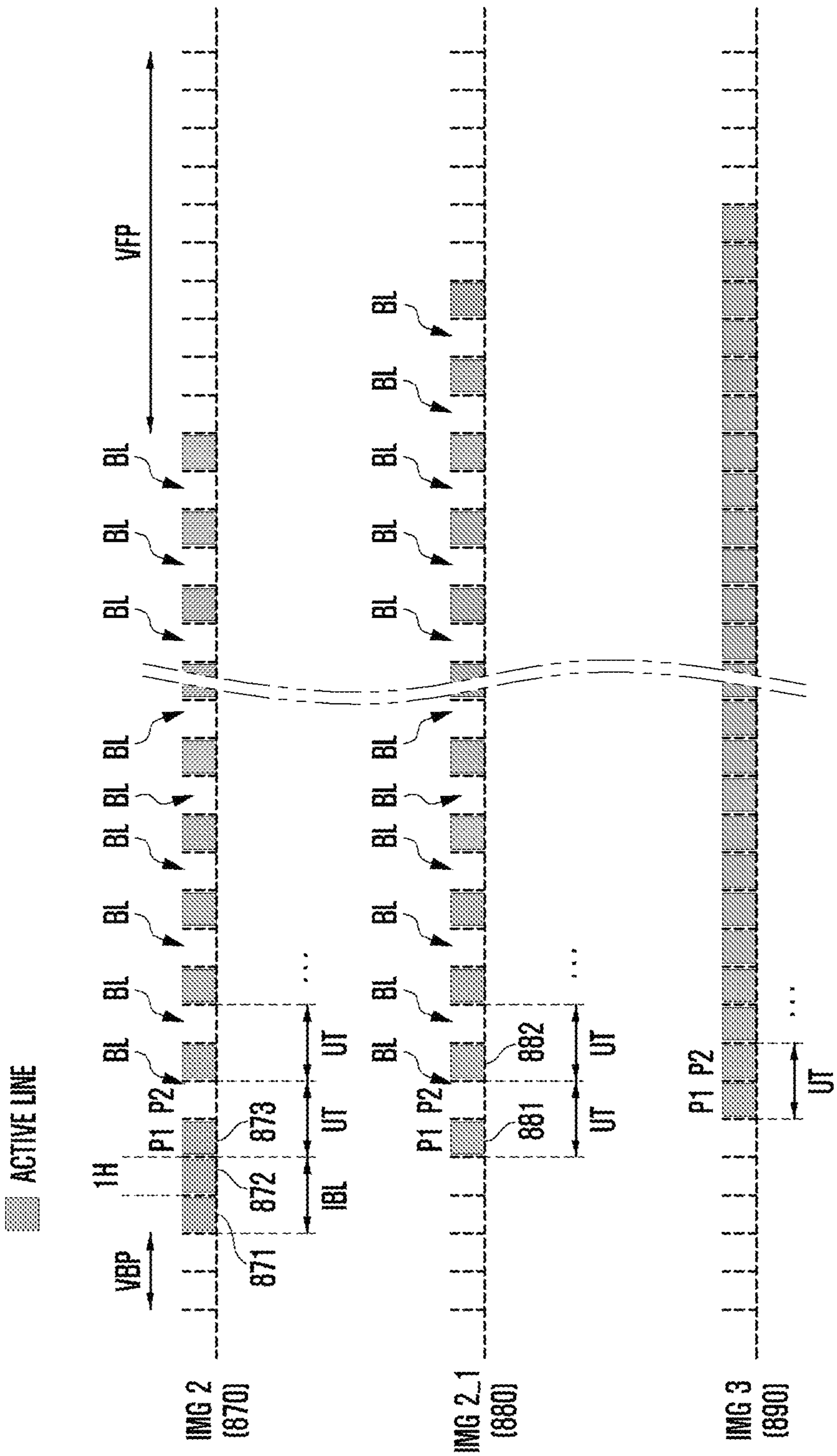
FIG. 8C illustrates an example of the operation in which a DDI decodes input image data and performs upscaling of an input image data according to a designated third ratio when a processor transmits encoded image data to the DDI according to an embodiment of the disclosure.

FIG. 8C illustrates an example of an operation in which a DDI 230 decodes input image data and performs upscaling of an input image data according to a designated third ratio when a processor 120 transmits encoded image data to the DDI 230 according to an embodiment of the disclosure.

For example, the third ratio designated in FIG. 8C may be 2/1, and the upscaler 331 of the DDI 230 may perform upscaling of a resolution of the second image data IMG2 input from the processor 120 to increase by 2/1 times to generate third image data IMG3.

In FIG. 8C, a waveform diagram 870 illustrates second image data IMG2 transmitted from the processor 120 to the DDI 230. In FIG. 8C, a waveform diagram 880 illustrates second image data IMG2_1 decoded by the decoder 332 of the DDI 230 to be input to the upscaler 331. In FIG. 8C, a waveform diagram 890 illustrates third image data IMG3 generated by the upscaler 331.

In each of the waveform diagram 870, the waveform diagram 880, and the waveform diagram 890 of FIG. 8C, a horizontal length of each section divided by a vertical dotted line may mean one horizontal period (1H) corresponding to an output resolution of the display panel 310. In an example, in the waveform diagram 870 of FIG. 8C, two consecutive sections may be two horizontal periods corresponding to the output resolution of the display panel 310.

In each of the waveform diagram 870, the waveform diagram 880, and the waveform diagram 890 of FIG. 8C, a section including shading (or hatching) may represent a section in which one horizontal line data is transmitted. In each of the waveform diagram 870, the waveform diagram 880, and the waveform diagram 890 of FIG. 8C, a section that does not include shading (or hatching) may represent a blank section BL in which one horizontal line data is not transmitted.

With reference to the waveform diagram 870, the timing controller 324 of the processor 120 may configure the designated K number of horizontal line data transmitted first among all horizontal line data included in the second image data IMG2 to "initial buffer lines (IBL)" transmitted continuously without a blank section BL. In the example of FIG. 8C, "initial buffer lines (IBL)" may be two designated horizontal line data transmitted first among all horizontal line data included in the second image data IMG2. In an example, the decoder 332 of the DDI 230 may need to continuously receive three horizontal line data in order to decode one horizontal line data. Taking the above necessary conditions into consideration, the timing controller 324 may continuously transmit two designated horizontal line data transmitted first among all horizontal line data included in the first image data IMG1 without a blank section BL. The above numerical values are only an example and the disclosure is not limited thereto.

The timing controller 324 of the processor 120 may divide the remaining horizontal line data excluding horizontal line data corresponding to "initial buffer lines (IBL)" into a plurality of unit sections UT. In the plurality of unit sections UT, horizontal line data and a blank section BL may be arranged according to a certain rule. For example, each of the plurality of unit sections UT configured by the timing controller 324 may have a total length of two horizontal periods and include one horizontal line data and one blank section BL. In the case that two horizontal periods included in one unit section UT are defined as a first period P1 and a second period P2, the timing controller 324 may configure any one period of the first period P1 and the second period P2 as a blank section BL.

With reference to the waveform diagram 880 of FIG. 8C, the decoder 332 of the DDI 230 may decode second image data IMG2 input from the processor 120 according to a designated standard, and provide the decoded second image data IMG2_1 to the upscaler 331. According to an embodiment, the second image data IMG2_1 decoded by the decoder 332 may include a plurality of unit sections UT, and each unit section UT may have a total length of two horizontal periods according to a designated third ratio for an upscaling operation and include one horizontal line data and one blank section BL. According to another embodiment, first horizontal line data 881 output first among second image data IMG2_1 decoded by the decoder 332 may be data decoded based on first to second horizontal line data 871 and 872 among horizontal line data of "initial buffer lines (IBL)" output from the timing controller 324. For example, horizontal line data 881 output first in the waveform diagram 880 of FIG. 8C may be data decoded based on two consecutive horizontal line data 871 and 872 first output in the waveform diagram 870 of FIG. 8C.

According to an embodiment, second horizontal line data 882 output second among second image data IMG2_1 decoded by the decoder 332 may be data decoded based on the second to third horizontal line data 872 and 873 among horizontal line data of "initial buffer lines (IBL)" output from the timing controller 324. For example, horizontal line data 882 output second in the waveform diagram 880 of FIG. 8C may be data decoded from the second horizontal line data based on two consecutive horizontal line data 872 and 873 in the waveform diagram 870 of FIG. 8C. The decoder 332 may decode the remaining horizontal line data based on two consecutive horizontal line data input sequentially, similar to the examples described above.

With reference to the waveform diagram 890 of FIG. 8C, the upscaler 331 of the DDI 230 may generate the M number of horizontal line data using the N number of horizontal line data included in each of the plurality of unit sections UT of the second image data IMG2. For example, the upscaler 331 of the DDI 230 may generate two horizontal line data using one horizontal line data included in each unit, thereby generating third consecutive image data IMG3 without a blank section BL.

Figure 9A:
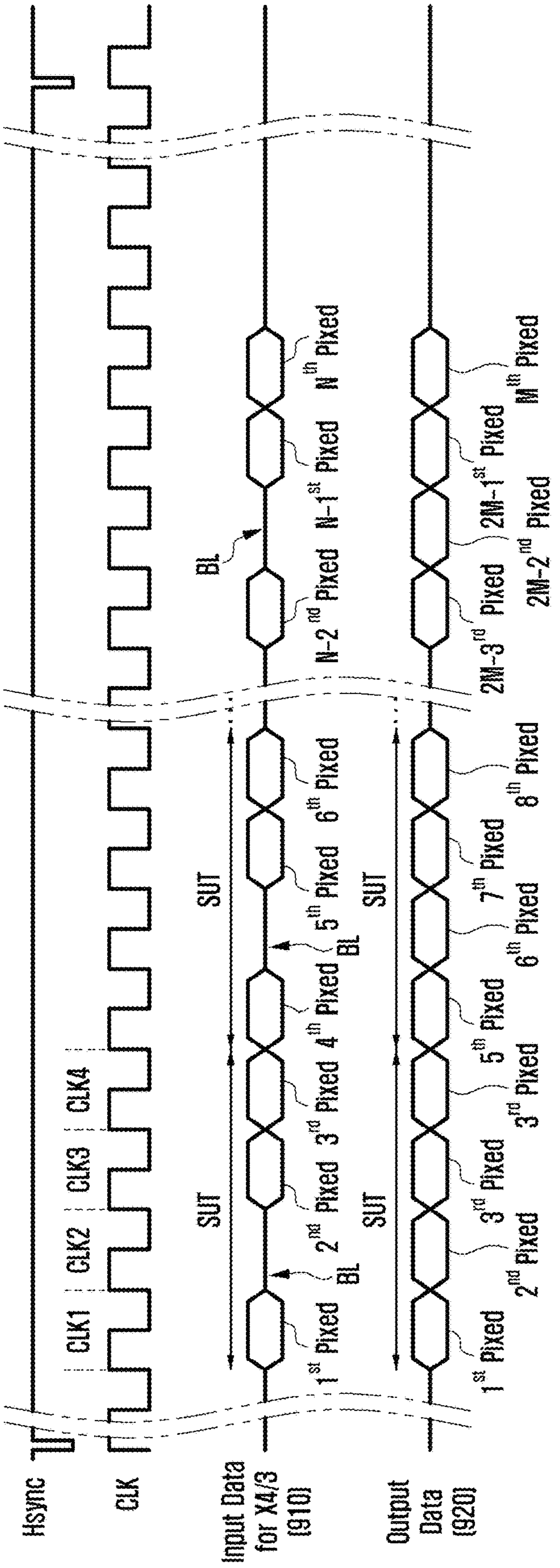
FIG. 9A illustrates an example of an operation in which a DDI upscaler performs upscaling of image data corresponding to one horizontal line according to a designated first ratio according to an embodiment of the disclosure.

FIG. 9A illustrates an example of an operation in which an upscaler 331 of a DDI 230 performs upscaling of image data corresponding to one horizontal line according to a designated first ratio according to an embodiment of the disclosure.

For example, a first ratio designated in FIG. 9A may be 4/3, and the upscaler 331 of the DDI 230 may perform upscaling of a horizontal resolution of second image data IMG2 input from the processor 120 to increase by 4/3 times to generate third image data IMG3.

In FIG. 9A, a waveform diagram 910 illustrates image data corresponding to one specific horizontal line of second image data IMG2 input from the processor 120 to the upscaler 331 of the DDI 230. In FIG. 9A, a waveform diagram 920 illustrates image data corresponding to one horizontal line converted by the upscaler 331.

In each of the waveform diagram 910 and the waveform diagram 920 of FIG. 9A, a section schematized as a hexagon may, for example, represent a section in which data corresponding to one pixel is transmitted. In each of the waveform diagram 910 and the waveform diagram 920 of FIG. 9A, a section schematized with only a solid line may represent a blank section BL in which data corresponding to one pixel is not transmitted.

With reference to the waveform diagram 910 of FIG. 9A, the timing controller 324 of the processor 120 may divide pixel data corresponding to one horizontal line into a plurality of subunit sections SUT. In the plurality of subunit sections SUT, at least one clock section in which one pixel data is transmitted and at least one blank section BL may be arranged according to a certain rule. Each of the plurality of subunit sections SUT configured by the timing controller 324 may have a total length of a K1 clock section, and include a K2 clock section in which the K2 number of pixel data are transmitted and a blank section BL configured to a (K1−K2) clock section. For example, each of the plurality of subunit sections SUT configured by the timing controller 324 may have a total length of four clock sections CLK1, CLK2, CLK3, and CLK4, and include three clock sections in which three pixel data are transmitted and a blank section BL configured to one clock section. In the case that four clock sections included in one subunit section SUT are defined as a first clock section CLK1, a second clock section CLK2, a third clock section CLK3, and a fourth clock section CLK4, the timing controller 324 may configure any one of the first clock section CLK1 to the fourth clock section CLK4 as the blank section BL. In the illustrated example, in one subunit section SUT, the blank section BL may be the second clock section CLK2, but the blank section BL may not be the second clock section CLK2.

With reference to the waveform diagram 920 of FIG. 9A, the upscaler 331 of the DDI 230 may generate the M number of pixel data using the N number of pixel data included in each of a plurality of subunit sections SUT corresponding to one horizontal line of the second image data IMG2. For example, the upscaler 331 of the DDI 230 may generate four pixel data using three pixel data included in each subunit, thereby generating corresponding image data in one horizontal line including continuous pixel data without a blank section BL.

Figure 9B:
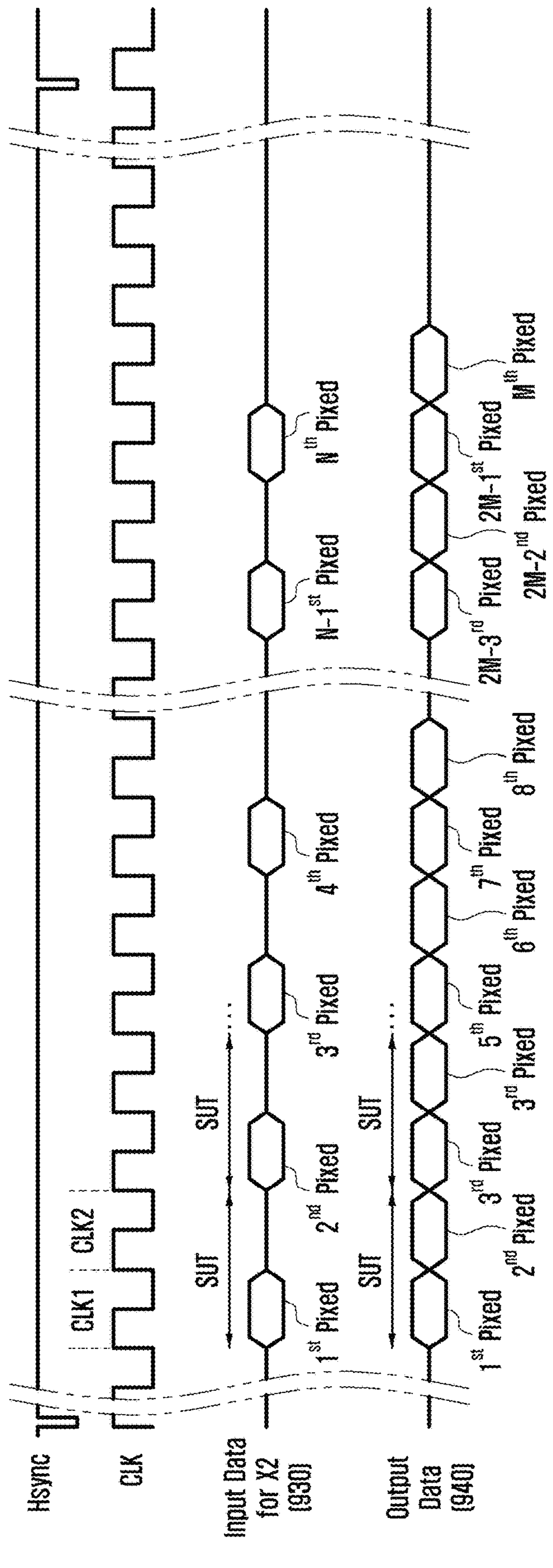
FIG. 9B illustrates an example of an operation in which a DDI upscaler performs upscaling of image data corresponding to one horizontal line according to a designated second ratio according to an embodiment of the disclosure.

FIG. 9B illustrates an example of an operation in which an upscaler 331 of a DDI 230 performs upscaling of image data corresponding to one horizontal line according to a designated second ratio according to an embodiment of the disclosure.

For example, the second ratio designated in FIG. 9B may be 2/1, and the upscaler 331 of the DDI 230 may perform upscaling of a horizontal resolution of second image data IMG2 input from the processor 120 to increase 2/1 times to generate third image data IMG3.

In FIG. 9B, a waveform diagram 930 illustrates image data corresponding to one specific horizontal line of second image data IMG2 input from the processor 120 to the upscaler 331 of the DDI 230. In FIG. 9B, a waveform diagram 940 illustrates image data corresponding to one horizontal line converted by the upscaler 331.

In each of the waveform diagram 930 and the waveform diagram 940 of FIG. 9B, a section schematized as a hexagon may represent a section in which data corresponding to one pixel is transmitted. In each of the waveform diagram 930 and the waveform diagram 940 of FIG. 9B, a section schematized with only a solid line may represent a blank section BL in which data corresponding to one pixel is not transmitted.

With reference to the waveform diagram 930 of FIG. 9B, the timing controller 324 of the processor 120 may divide pixel data corresponding to one horizontal line into a plurality of subunit sections SUT. In the plurality of subunit sections SUTs, at least one clock section in which one pixel data is transmitted and at least one blank section BL may be arranged according to a certain rule. Each of the plurality of subunit sections SUT configured by the timing controller 324 may have a total length of a K1 clock section, and include a K2 clock section in which the K2 number of pixel data are transmitted and a blank section BL configured to a (K1−K2) clock section. For example, each of the plurality of subunit sections SUT configured by the timing controller 324 may have a total length of 2 clock sections CLK1 and CLK2 and include one clock section in which one pixel data is transmitted, and a blank section BL configured to one clock section. In the case that two clock sections included in one subunit section SUT are defined as a first clock section CLK1 and a second clock section CLK2, the timing controller 324 may configure any one of the first clock section CLK1 and the second clock section CLK2 as the blank section BL. In the illustrated example, in one subunit section SUT, the blank section BL may be the second clock section CLK2, but the blank section BL may be the first clock section CLK1.

With reference to the waveform diagram 940 of FIG. 9B, the upscaler 331 of the DDI 230 may generate the M number of pixel data using the N number of pixel data included in each of a plurality of subunit sections SUT corresponding to one horizontal line of the second image data IMG2. For example, the upscaler 331 of the DDI 230 may generate two pixel data using one pixel data included in each subunit, thereby generating corresponding image data in one horizontal line including continuous pixel data without a blank section BL.

Figure 10:
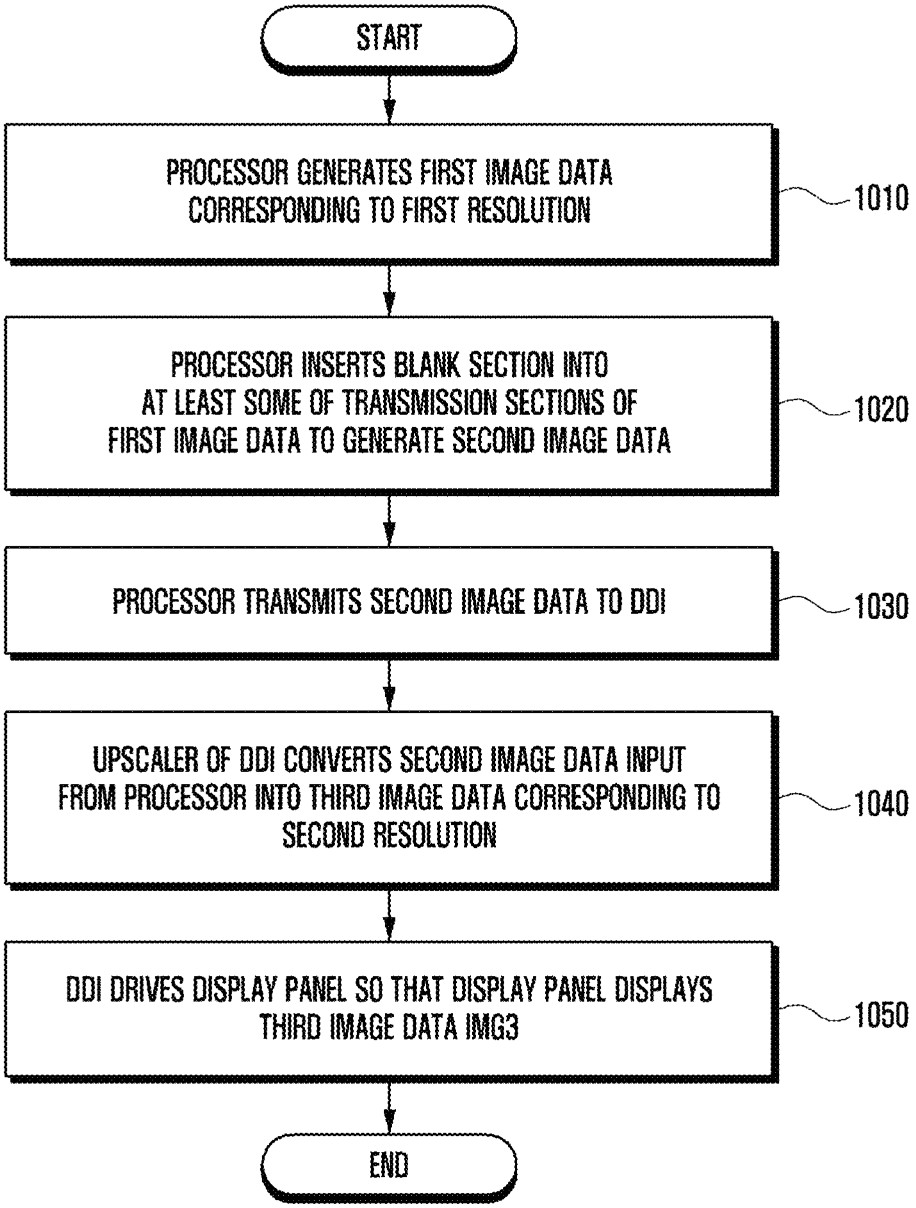
FIG. 10 is a flowchart illustrating a process in which an electronic device performs an upscaling operation according to an embodiment of the disclosure.

FIG. 10 is a flowchart illustrating an electronic device 300 performing an upscaling operation according to an embodiment of the disclosure.

For example, the electronic device 300 may activate an upscaling operation based on a user input and perform at least some of operations illustrated in FIG. 10 based on the upscaling operation being activated.

At least some of operations illustrated in FIG. 10 may be omitted. At least some operations described with reference to other drawings in the disclosure may be additionally inserted before or after at least some of operations illustrated in FIG. 10.

The operations illustrated in FIG. 10 may be performed by a processor 120 (e.g., the processor 120 of FIG. 1). For example, a memory (e.g., the memory 130 of FIG. 1) of an electronic device 300 may store, when executed, instructions that cause the processor 120 to perform at least some of operations illustrated in FIG. 10.

In operation 1010, the processor 120 of the electronic device 300 according to an embodiment may generate first image data IMG1 corresponding to a first resolution.

In operation 1020, the electronic device 300 according to an embodiment may cause the processor 120 to insert a blank section BL into at least some of transmission sections of first image data IMG1 to generate second image data IMG2. The image generator 321 of the processor 120 may generate first image data IMG1 corresponding to the first resolution based on an executed application. The first resolution may be a resolution smaller than a second resolution, which is an output resolution of the display panel 310. The image generator 321 may provide the generated first image data IMG1 to the display controller 322. The first resolution and the second resolution may be configured to have a designated ratio. The designated rate may be a rate at which the DDI 230 performs upscaling of image data input from the processor 120, and the rate may be changed to various values.

In operation 1030, the processor 120 of the electronic device 300 according to an embodiment may transmit second image data IMG2 to the DDI 230. The timing controller 324 may change a horizontal synchronization signal Hsync based on a designated ratio, which is a ratio of the first resolution and the second resolution based on the upscaling operation being activated. The timing controller 324 may change a first horizontal synchronization signal Hsync1 corresponding to the first resolution to a second horizontal synchronization signal Hsync2 corresponding to the second resolution based on a designated ratio. For example, in the case that the first resolution is an HD resolution and that the second resolution, which is an output resolution of the display panel 310, is a WQHD resolution, the timing controller 324 may configure a frequency of the second horizontal synchronization signal Hsync2 to be twice a frequency of the first synchronization signal Hsync1.

According to an embodiment, the timing controller 324 of the processor 120 may adjust a length of each transmission section of the first image data IMG1 based on the second horizontal synchronization signal Hsync2. The timing controller 324 may adjust a length of a transmission section of the first image data IMG1 so that a portion of the first image data IMG1 corresponding to one horizontal line is transmitted in synchronization with the second horizontal synchronization signal Hsync2.

According to another embodiment, the timing controller 324 may convert the first image data IMG1 into the second image data IMG2 by adding a blank section BL between at least some sections of transmission sections of the first image data IMG1. The second image data IMG2 is image data corresponding to the first resolution, but a length of each section in which data is transmitted is adjusted and each section includes a blank section BL, thereby having a data flow corresponding to the second resolution.

In operations 1040 and 1050, in the electronic device 300 according to an embodiment, the upscaler 331 of the DDI 230 may convert second image data IMG2 input from the processor 120 into third image data IMG3 corresponding to the second resolution. In the electronic device 300 according to an embodiment, the DDI 230 may drive the display panel 310 so that the display panel 310 displays third image data IMG3.

According to an embodiment, the DDI 230 may include an upscaler 331 for converting the second image data IMG2 input from the processor 120 into third image data IMG3 corresponding to a second resolution larger than the first resolution by a designated ratio. The DDI 230 may drive the display panel 310 so that the display panel 310 displays the third image data IMG3 converted by the upscaler 331.

According to another embodiment, the DDI 230 may be configured to drive the display panel 310 based on a video mode. For example, the DDI 230 may not include a buffer memory 323 for storing image data, for example, the second image data IMG2 input from the processor 120.

According to yet another embodiment, the display panel 310 may include a plurality of pixels 311 having a designated resolution, for example, a second resolution. The plurality of pixels 311 may be arranged in a matrix form, and the DDI 230 may drive a plurality of pixels 311 arranged in a matrix form to display third image data IMG3 based on a horizontal synchronization signal Hsync and a vertical synchronization signal Vsync.

An electronic device (e.g., the electronic device 101 of FIG. 1) may include a display (e.g., the display module 160 of FIG. 1); a display driver IC (DDI) (e.g., the DDI of FIG. 3) configured to drive the display 160 based on a video mode; and a processor (e.g., the processor 120 of FIG. 1), wherein the processor 120 may be configured to generate first image data (e.g., the first image data IMG2 of FIG. 3) corresponding to a first resolution, to generate second image data (e.g., the second image data IMG2 of FIG. 3) by adding a blank section to at least some sections of the first image data, and to transmit the second image data IMG2 to the DDI 230, wherein the DDI 230 may include an upscaler (e.g., the upscaler 331 of FIG. 3) configured to convert the second image data IMG2 input from the processor 120 into third image data (e.g., the third image data IMG3 of FIG. 3) corresponding to a second resolution larger than the first resolution by a designated ratio, and be configured to drive the display 160 so that the display 160 displays the third image data IMG3.

The DDI 230 may not include a buffer memory configured to store the second image data IMG2 input from the processor 120.

According to an embodiment, the processor 120 may include an image generator configured to generate the first image data IMG1 based on an executed application; a buffer memory configured to store the first image data IMG1; and a timing controller configured to generate the second image data IMG2 by adjusting output timing of the first image data IMG1 according to the designated ratio.

The timing controller may be configured to change a first horizontal synchronization signal corresponding to the first resolution to a second horizontal synchronization signal corresponding to the second resolution based on the designated ratio, to adjust a length of each transmission section of the first image data IMG1 based on the second horizontal synchronization signal, and to convert the first image data IMG1 into the second image data IMG2 by adding the blank section between at least some sections of the adjusted transmission sections of the first image data IMG1.

According to an embodiment, when converting the first image data IMG1 into the second image data IMG2, the timing controller may be configured to divide transmission sections of the first image data IMG1 into a plurality of unit sections in which horizontal line data of the first image data IMG1 are arranged according to a designated rule, and each of the plurality of unit sections may include at least one blank section between the horizontal line data of the first image data IMG1.

Each of the plurality of unit sections may have a total length of the K1 number of horizontal periods based on the designated magnification, and include K2 number of horizontal line data and (K1−K2) number of blank sections, and the designated magnification may be K1/K2.

According to an embodiment, when converting the second image data IMG2 into the third image data IMG3, the upscaler 331 may be configured to generate the K1 number of horizontal line data using the K2 number of horizontal line data included in each of the plurality of unit sections.

According to another embodiment, the timing controller may include an encoder configured to encode the first image data IMG1 generated by the image generator based on a designated standard, and the encoder may be configured to provide the encoded first image data IMG1 to the timing controller.

The DDI 230 may include a decoder configured to receive an input of the second image data encoded according to the designated standard from the processor 120, and the decoder may be configured to decode the input second image data IMG2 according to the designated standard and to provide the decoded second image data IMG2 to the upscaler 331.

According to an embodiment, the timing controller may be configured to continuously transmit the designated K number of horizontal line data transmitted first among the N number of horizontal line data included in the first image data IMG1 encoded by the encoder without a blank section.

According to another embodiment, a method performed by an electronic device 101 including a display driver IC (DDI) 230 configured to drive a display 160 based on a video mode may include generating, by a processor 120, first image data IMG1 corresponding to a first resolution; generating, by the processor 120, second image data IMG2 by adding a blank section to at least some sections of the first image data IMG1; transmitting, by the processor 120, the second image data IMG2 to the DDI 230; converting, by an upscaler 331 of the DDI 230, the second image data IMG2 input from the processor 120 into third image data IMG3 corresponding to a second resolution larger than the first resolution by a designated ratio; and driving, by the DDI 230, the display 160 so that the display 160 displays the third image data IMG3.

The DDI 230 may not include a buffer memory configured to store the second image data IMG2 input from the processor 120.

According to an embodiment, the processor 120 may include an image generator configured to generate the first image data IMG1 based on an executed application; a buffer memory configured to store the first image data IMG1; and a timing controller configured to generate the second image data IMG2 by adjusting output timing of the first image data IMG1 according to the designated ratio.

According to another embodiment, the method may further include changing, by the timing controller, a first horizontal synchronization signal corresponding to the first resolution to a second horizontal synchronization signal corresponding to the second resolution based on the designated ratio; adjusting, by the timing controller, a length of each transmission section of the first image data IMG1 based on the second horizontal synchronization signal; and converting, by the timing controller, the first image data IMG1 into the second image data IMG2 by adding the blank section between at least some sections of the adjusted transmission sections of the first image data IMG1.

The method may further include dividing, by the timing controller, transmission sections of the first image data IMG1 into a plurality of unit sections in which horizontal line data of the first image data IMG1 are arranged according to a designated rule, wherein each of the plurality of unit sections may include at least one blank section between the horizontal line data of the first image data IMG1.

According to an embodiment, each of the plurality of unit sections may have a total length of the K1 number of horizontal periods based on the designated magnification, and include K2 number of horizontal line data and (K1−K2) number of blank sections, and the designated magnification may be K1/K2.

The method may further include generating, by the upscaler 331, K1 number of horizontal line data using the K2 number of horizontal line data included in each of the plurality of unit sections.

According to an embodiment, the timing controller may include an encoder configured to encode the first image data IMG1 generated by the image generator based on a designated standard, and the method may further include providing first image data IMG1 encoded by the encoder to the timing controller.

According to another embodiment, the DDI 230 may include a decoder configured to receive an input of the second image data IMG2 encoded according to the designated standard from the processor 120 and the method may further include decoding, by the decoder, the input second image data IMG2 according to the designated standard, and providing the decoded second image data IMG2 to the upscaler 331.

The method may further include continuously transmitting, by the timing controller, the designated K number of horizontal line data transmitted first among the N number of horizontal line data included in the first image data IMG1 encoded in the encoder without a blank section.

According to an embodiment, a recording medium for storing instructions readable by a processor of an electronic device, wherein the instructions may cause the processor to generate first image data corresponding to a first resolution. The instructions may cause the processor to generate second image data by adding a blank section to at least some sections of the first image data. The instructions may cause the processor to transmit the second image data to a display driver IC (DDI) of the electronic device. The instructions may cause an upscaler of the DDI to convert the second image data input from the processor into third image data corresponding to a second resolution larger than the first resolution by a designated ratio. The instructions may cause the DDI to drive the display so that the display displays the third image data.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and equivalents.

What is claimed is:

1. An electronic device, comprising:

a display;

a display driver IC (DDI) configured to drive the display based on a video mode;

memory storing one or more computer programs; and one or more processors communicatively coupled to the display, the DDI, and the memory, wherein the one or more computer programs include computer-executable instructions that, when executed by the one or more processors individually or collectively, cause the electronic device to:

generate first image data corresponding to a first resolution, generate second image data by inserting a blank section between at least some sequences of horizontal line data of the first image data, the blank section being inserted based on a second resolution that is larger than the first resolution, so that the second image data has a data flow corresponding to the second resolution, and transmit the second image data to the DDI, and wherein the DDI comprises an upscaler configured to convert the second image data input from the one or more processors into third image data corresponding to the second resolution, and drive the display to display the third image data.

2. The electronic device of claim 1, wherein the DDI does not comprise a buffer memory configured to store the second image data input from the one or more processors.

3. The electronic device of claim 1, wherein the one or more processors comprises:

an image generator configured to generate the first image data based on an executed application;

a buffer memory configured to store the first image data; and a timing controller configured to generate the second image data by adjusting output timing of the first image data according to a designated ratio.

4. The electronic device of claim 3, wherein the timing controller is configured to:

change a first horizontal synchronization signal corresponding to the first resolution to a second horizontal synchronization signal corresponding to the second resolution based on a designated ratio;

adjust a length of each transmission section of the first image data based on the second horizontal synchronization signal; and convert the first image data into the second image data by adding the blank section between at least some sections of the adjusted transmission sections of the first image data.

5. The electronic device of claim 4, wherein, when converting the first image data into the second image data, the timing controller is configured to divide transmission sections of the first image data into a plurality of unit sections in which horizontal line data of the first image data are arranged according to a designated rule, and each of the plurality of unit sections comprises at least one blank section between the horizontal line data of the first image data.

6. The electronic device of claim 5, wherein each of the plurality of unit sections has a total length of a K1 number of horizontal periods based on a designated magnification, and includes a K2 number of horizontal line data and (K1−K2) number of blank sections, and wherein the designated magnification is K1/K2.

7. The electronic device of claim 6, wherein the upscaler is configured to generate the K1 number of horizontal line data using the K2 number of horizontal line data included in each of the plurality of unit sections, when converting the second image data into the third image data.

8. The electronic device of claim 3, wherein the timing controller comprises an encoder configured to encode the first image data generated by the image generator based on a designated standard; and wherein the encoder is configured to provide the encoded first image data to the timing controller.

9. The electronic device of claim 8, wherein the DDI comprises a decoder configured to receive an input of the second image data encoded according to the designated standard from the one or more processors; and wherein the decoder is configured to decode the input second image data according to the designated standard and to provide the decoded second image data to the upscaler.

10. The electronic device of claim 8, wherein the timing controller is configured to continuously transmit a designated K number of horizontal line data transmitted first among an N number of horizontal line data included in first image data encoded by the encoder without a blank section.

11. The electronic device of claim 1, wherein the blank section includes a section in which image data is not transferred among horizontal periods within a unit section.

12. The electronic device of claim 1, wherein the blank section is arranged such that each of a plurality of unit sections configured by a timing controller has a total length of three horizontal periods and include two horizontal line data and one blank section.

13. A method performed by an electronic device including a display driver IC (DDI) configured to drive a display based on a video mode, the method comprising:

generating, by one or more processors, first image data corresponding to a first resolution;

generating, by the one or more processors, second image data by inserting a blank section to between at least some sequences of horizontal line data of the first image data, the blank section being inserted based on a second resolution that is larger than the first resolution, so that the second image data has a data flow corresponding to the second resolution;

transmitting, by the one or more processors, the second image data to the DDI;

converting, by an upscaler of the DDI, the second image data input from the one or more processors into third image data corresponding to the second resolution; and driving, by the DDI, the display to display the third image data.

14. The method of claim 13, wherein the DDI does not comprise a buffer memory configured to store the second image data input from the one or more processors.

15. The method of claim 13, wherein the one or more processors comprises:

an image generator configured to generate the first image data based on an executed application;

a buffer memory configured to store the first image data; and a timing controller configured to generate the second image data by adjusting output timing of the first image data according to a designated ratio.

16. The method of claim 15, further comprising:

changing, by the timing controller, a first horizontal synchronization signal corresponding to the first resolution to a second horizontal synchronization signal corresponding to the second resolution based on a designated ratio;

adjusting, by the timing controller, a length of each transmission section of the first image data based on the second horizontal synchronization signal; and converting, by the timing controller, the first image data into the second image data by adding the blank section between at least some sections of the adjusted transmission sections of the first image data.

17. The method of claim 16, further comprising:

dividing, by the timing controller, transmission sections of the first image data into a plurality of unit sections in which horizontal line data of the first image data are arranged according to a designated rule, wherein each of the plurality of unit sections comprises at least one blank section between the horizontal line data of the first image data.

18. The method of claim 17, wherein each of the plurality of unit sections has a total length of a K1 number of horizontal periods based on a designated magnification, and includes a K2 number of horizontal line data and (K1−K2) number of blank sections, and wherein the designated magnification is K1/K2.

19. The method of claim 18, wherein the upscaler is configured to generate the K1 number of horizontal line data using the K2 number of horizontal line data included in each of the plurality of unit sections, when converting the second image data into the third image data.

20. The method of claim 15, wherein the timing controller comprises an encoder configured to encode the first image data generated by the image generator based on a designated standard; and wherein the encoder is configured to provide the encoded first image data to the timing controller.

21. One or more non-transitory computer-readable storage media storing one or more computer programs including computer-executable instructions that, when executed by one or more processors of an electronic device individually or collectively, cause the electronic device to perform operations, the operations comprising:

generating first image data corresponding to a first resolution;

generating second image data by inserting a blank section between at least some sequences of horizontal line data of the first image data, the blank section being inserted based on a second resolution that is larger than the first resolution, so that the second image data has a data flow corresponding to the second resolution;

transmitting the second image data to a display driver IC (DDI);

converting, by an upscaler of the DDI, the second image data input into third image data corresponding to the second resolution; and driving, by the DDI, a display to display the third image data.

22. The one or more non-transitory computer-readable storage media of claim 21, wherein the DDI does not comprise a buffer memory configured to store the second image data input.

* * * * *